(12) United States Patent
Tribelsky et al.

(10) Patent No.: US 6,592,245 B1
(45) Date of Patent: Jul. 15, 2003

(54) METHOD FOR OPTICALLY MARKING AN ELONGATED INDICATION PATH AND DEVICES USING SAME

(76) Inventors: Zamir Tribelsky, Derech Haachayot 9, Ein Karem, Jerusalem (IL), 95744; Michael Ende, Moshav Shoeva (IL), 90855

( * ) Notice: Subject to any disclaimer, the term of this patent is extended or adjusted under 35 U.S.C. 154(b) by 0 days.

(21) Appl. No.: 09/355,892
(22) PCT Filed: Feb. 5, 1998
(86) PCT No.: PCT/IL98/00057
§ 371 (c)(1), (2), (4) Date: Aug. 6, 1999
(87) PCT Pub. No.: WO98/35181
PCT Pub. Date: Aug. 13, 1998

(30) Foreign Application Priority Data
Feb. 7, 1997 (IL) .................................. 120175

(51) Int. Cl.[7] .................................. F21V 7/04
(52) U.S. Cl. ............... 362/551; 362/552; 362/583; 362/559; 362/259; 385/93; 385/901
(58) Field of Search ................. 362/551, 552, 362/583, 559, 259; 385/901, 93, 33, 37

(56) References Cited

U.S. PATENT DOCUMENTS

| | | | |
|---|---|---|---|
| 3,981,706 A | * 9/1976 | Strack | 65/410 |
| 4,251,286 A | 2/1981 | Barnett | 136/260 |
| 4,387,955 A | * 6/1983 | Ludman et al. | 385/37 |
| 4,422,719 A | 12/1983 | Orcutt | 385/123 |
| 4,606,280 A | 8/1986 | Poulton et al. | 108/97 |
| 4,740,870 A | 4/1988 | Moore et al. | 362/477 |
| 5,333,228 A | 7/1994 | Kingstone | 385/100 |
| 5,539,624 A | 7/1996 | Dougherty | 362/556 |

FOREIGN PATENT DOCUMENTS

| | | |
|---|---|---|
| DE | 43 26 525 | 2/1994 |
| FR | 2573512 | 5/1986 |
| FR | 2711249 | 4/1995 |
| WO | 92 09909 | 6/1992 |

* cited by examiner

*Primary Examiner*—Sandra O'Shea
*Assistant Examiner*—Ronald E. DelGizzi

(57) ABSTRACT

The present invention relates to a method for optically marking an elongated indication path. This method is comprised of supporting an optic sieve (1) along an exposed indication path, and aligning an end (4) of the optic sieve (1) (or networks of sections of optic sieves) with a light source (2) (or light socket harnessing the collective outputs of a plurality of light sources). The optic sieve (1) in the context of the present invention is characterised by having at least one side emitting optic fiber within a flexible semi opaque holographically grooved sleeve. The present invention also relates to devices having optically marked elongated indication paths according to the method of the present invention.

55 Claims, 12 Drawing Sheets

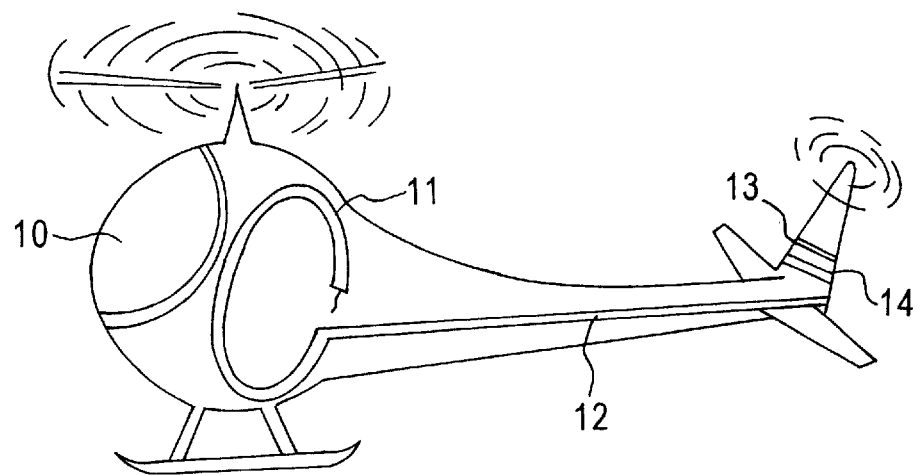
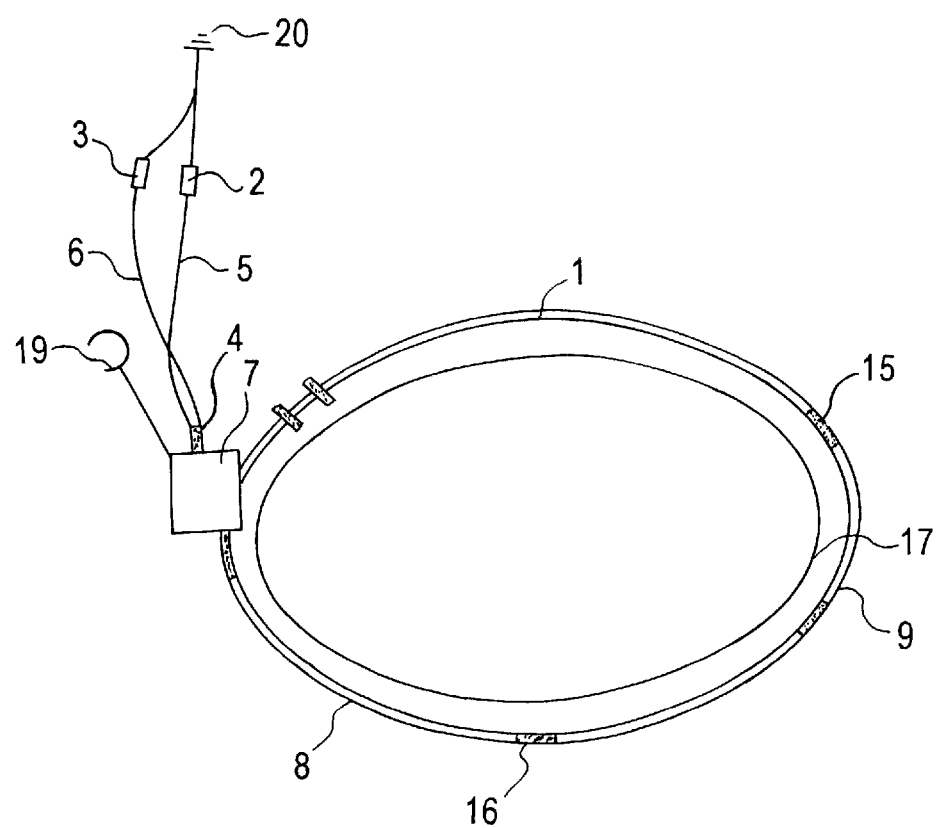
FIG. 1

METHOD FOR OPTICALLY MARKING AN ELONGATED INDICATION PATH AND DEVICES USING SAME

FIELD OF THE INVENTION

The present invention generally relates to a method for optically marking an elongated indication path, especially useful for Intelligent Transport Safety (e.g. known in short as ITS) signs, signals or trance uniform illumination wherein light is delivered or distributed in a trance uniform flux density). More specifically the present invention relates to supporting a light guide (e.g. light conduit, liquid light guide, photon guide/s, fiber or fiber bundle/s) along an indication path, and aligning an end of the light guide with (a light source or a plurality of light source's output/s) an optical light socket wherein the light guide is characterized by having at least one side emitting optic fiber within a flexible (holographically grooved grated tube) semi-opaque sleeve. The present invention also relates to devices using the method for optically marking an elongated indication path of the present invention.

BACKGROUND OF THE INVENTION

Outdoor signs and signals (as used in transportation and advertising) are often integrated with an illumination mechanism. The illumination mechanism allows the signs and signals greater visibility, especially at night (or during reduced visibility due to whether conditions such as fog, storms, rain, winds, dust, smoke). The illumination mechanism is often by external lighting sources from the front, or from the rear through semi opaque sections. Another well known illumination mechanism is by incorporating light sources into the surface of the sign (or signal). Regardless of the location of the light sources, each such source requires individual electric circuitry (and individual optical alignment or housing as well as subsequently individual maintenance).

According to any of these well known methods of illumination, the optical marking of an elongated indication path is prohibitively expensive and cumbersome because a large number of light sources are required, these well known methods include serial connection of a plurality of light sources (e.g. each light source is aligned to single light guide, fiber, or light conduits or lens or signs and signals) without the ability to efficiently combine their collective outputs for long distance high intensity optical marking or illumination, Thus use of elongated illumination paths have found only limited uses in critical applications (such as highlighting air transport runways, oceanographic optical marking or illumination systems or ITS type systems (e.g. Intelligent Transport Systems—optical traffic warning signals) lighting systems and/or efficient light distribution fiber networks for optical marking or illumination).

As a practical alternative retro-reflective materials (such as paints and corner cubes) have found wide application. The specific limitation imposed by using retro-reflective materials (in place of elongated illumination paths) is that only the specific illuminated area of the retro-reflective material is highlighted for the observer's attention. The observer fails to become aware of the extent of the elongated marking by reason of his use of a limited source of illumination, or by his lack if having any illumination source. For example, the placement of retro-reflective paint on the road side only provides a night driver with indications of the road path (curvature) within the distance of his head lights' illumination. Obviously retro-reflective materials can not be used as ground markers for distant observers who may be in the air or at sea, because such observers can not practically provide a powerful source of wide angle illumination. Retro reflective materials also are subject to environmental deterioration, and also often accumulate obscuring layers of grime and mud.

Various methods and devices for Illuminating elongated paths by various methods of optic fibers arrangements are known. For example, such arrangements are disclosed in U.S. Pat. No. 5,333,228, FR 2711249, U.S. Pat. No. 4,422,719, U.S. Pat. No. 4,740,870 and WO 92/09909. All these devices, however are limited to a short distance illumination and to a single light source.

In contrast to the prior art, the method (and devices) of the present invention provides for the cost efficient optical marking or illumination of elongated indication paths. The cost efficiency associated with the present invention is derived from the lower costs of installation, operation, and maintenance of a central light distribution points which harnesses the collective optical outputs of a plurality of light sources providing for (adequate resolved or pre-mixed or post mixed light distribution) the flux density of the delivered light to be equalized and simultaneously broadly distributed spatially in a trance uniform manner (e.g. uniformly) using interconnected sections of optical fibers (or fiber bundles). To further appreciate the un-obviousness of the present invention, a brief introduction to technological aspects of certain critical components is hereinafter appended:

Optic fibers are commonly made of glass and glass-like materials. There are two well known types of optic fibers; end emitting and side emitting. End emitting optic fibers have found wide application as an efficient (low loss) long distance transmission medium—primarily for optical data related signals. Side emitting optic fibers have only found limited use as a short distance transmission medium, by reason of their low efficiency (high loss). Further more, Plastic Optical Fibers (e.g. known in short as POFs) have found limited uses in optical marking & illumination as a result of their low resistance to temperature changes (e.g. they melt or deteriorate in performance as a result of the high temperatures generated by the use of high intensity light source/s), Plastic Optical Fibers also demonstrate a much lower environmental durability (e.g. POFs can not withstand high photo-degradation levels associated with prolong exposure to sun-light) this limits the optical intensity that can be introduced to illuminate such (thermoplastics) POFs fibers as it require the introduction of expensive collimating lenses which further decrease the efficiency (flux density) of light they generate.

The present invention discloses a novel application methodology wherein side emitting fibers are used (single fiber or multi tail fiber bundles). By aligning the end of a side emitting optic fiber with a light source (or a plurality of light sources collectively harnessed to a light socket output alignment shunt/s), the transverse distribution of light along the length of the fiber provides a beneficial (e.g. uniformly or often homogeneous) illumination mechanism when the flux density of the delivered light is equalized and simultaneously broadly distributed spatially.

Optic fibers are commonly bundled into a light guide by placing a plurality of such fibers within a flexible sleeve or tube. The sleeve serves as a holding mechanism for the bundle (allowing convenient installation), and simultaneously protects the fibers from environmental damage (such as from moisture or sun light). When used as a transmission medium, the sleeve is holographically grooved to allow adequate spectral distribution for the purpose of optically marking (or high-lighting) an elongated indication path.

It must be recognized that many types of side emitting optical fibers have been suggested for the optical marking of elongated indication paths (even for transportation signs and signals). While these fibers operate well in the laboratory and in exhibitions, these fibers fail to provide the desired illumination when installed in the field. This is because the field is a harsh environment (for exposed optical fibers), having temperature extremes, and having long term exposure to mud, sun, grime, smog, depositions, molds, bacteria, wind born abrasive particles, etc. It must also be recognized that conventional sleeving (or cladding or sheathing) of optical fibers is a known art generally used to protect end emitting communication related optical fibers such as optical data transfer via fibers and not as a holographically grooved surface for trance uniform visible transmission medium for optical marking or illumination.

The method of the present invention (for optically marking an elongated indication path) is characterized by having at least one side emitting fiber within a flexible semi-opaque sleeve. The "effective ensleeving" of side emitting optical fibers (into semi opaque packaging) has circumstantially been applied to ultra-short illumination paths (such as in control panels for cars, etc.) However, the use of such sleeving (intently) for solving the actual operational barrier currently precluding viable installation of elongated indication paths (in the field) has not been forthcoming by those many technical persons active in the advancement of the prior art.

SUMMARY OF THE INVENTION

The present invention relates to a method for optically marking an elongated indication path. This method is comprised of supporting a light guide along an exposed indication path, and aligning an end of the light guide with a light source (or light socket harnessing the collective outputs of a plurality of light sources). The light guide in the context of the present invention is characterized by having at least one side emitting optic fiber within a flexible semi opaque holographically grooved sleeve.

The present invention also relates to devices having optically marked elongated indication paths according to the method of the present invention. Each of these devices is comprised of an indication path support, at least one exposed light guide supported along the indication path, and a light source (or plurality of light sources connected to or through an optical light socket) aligned with an end of the light guide, or networks of sections of light guides.

DETAILED DESCRIPTION OF THE INVENTION

The present invention relates to a method for optically marking an elongated indication path (and is especially useful for transportation signs and signals). The method of the present invention is comprised of supporting a light guide along an indication path, and aligning an end of the light guide with a light source/s (wherein the light guide is characterized by having at least one side emitting optic fiber within a flexible semi-opaque holographically grooved sleeve or tube).

Optically marking in the context of the present invention relates to mechanisms whereby light is distributed or illuminated or emitted for higher visibility or more convenient observation (along an indication path) with a predetermined spectral distribution.

An elongated indication path may have straight, curved, and bent sections (and the flexibility of the sleeve or tube should be chosen accordingly). Furthermore, obscuring sections of the elongated path (e.g. with paint or opaque sections) will produce the effect (to an observer) of a plurality of shorter (seemingly disconnected) indication paths. In principle this technique of selective obscuring is similar to the method (for use in Neon signs) whereby a long glass tube is bent and selectively coated to present the subsequently illuminated appearance of disconnected letters.

An elongated indication path in the context of the present invention also relates to a branching path (for the optical marking of an area, surface, or volume). The light guide supported along the branching path is a network of light guides spliced or splitted together using "T", "Y" or "star" or a combination matrix light guide end to end alignment shunts, (such that are integrated into the on board "connection cartridle" within the light socket) or could be attached or integrated into a common end of a single fiber or a plurality of fibers (wherein at least one of said fiber/s is side emitting optical fiber.

In the context of the present invention visible illumination is any optical radiation capable of causing a visual sensation directly, 400 nm–<700 nm.

In the context of the present invention ultra violet radiation is optical radiation for which the wave lengths are shorter then those for visible radiation, <400 nm (UVA 320 nm–400 nm, UVB 280 nm–320 nm, UVC<280 nm).

In the context of the present invention resolution is a measure of an instrument's ability to separate adjacent spectral line wherein By using a continuum light source, the band-pass of an instrument is the spectral interval that can be isolated.

In the context of the present invention uniformity is a measure of how the irradiance varies over a selected or predetermined area (e.g. trance uniform flux density)

In the context of the present invention sun light terrestrial spectra is the spectrum of the solar radiation at the earth's surface, wherein direct solar radiation is the part of extra terrestrial solar radiation which, as a collimated beam/s, reaches the earth's surface after selective attenuation by the atmosphere.

In The context of the present invention, a plurality of end emitting (optical) fibers may be substituted for side emitting (optical) fibers; when the aggregate surface area of the ends of the end emitting fibers is approximately equal to the operational (exposed) surface area of side emitting fibers; or when the flux density of the delivered light can be otherwise equalized and simultaneously broadly distributed spatially in a holographic trance uniform manner (e.g. distribution or uniform illumination).

In context of the present invention the sleeve may be a flexible holding tube (which is useful for managing the installation of a plurality of fibers) and/or the sleeve may be integrally attached to the exterior of each fiber (such as by vacuum deposition, coating, ultra sound, temperature changes during manufacturing, painting, etc.).

In the context of the present invention a "light guide" relate to a light conduit having inlet and outlet openings for light to be guided through in accordance with the conditions for total internal reflections such as side emitting optical fiber having a holographic outer diameter (or holographically grooved cladding or layer/s or nominal optical diameter) for Uniform light (e.g. trance uniform flux density) delivery, distribution and/or illumination.(e.g. optical marking) In the context of the present invention the semi opaque sleeve may be holographically grated spherical tube (e.g. Such as ion-etched holographically grated) which attached to the exterior of each fiber or fiber bundle and/or the semi opaque sleeve may be a flexible holding tube made out of a plurality of holographically grated layers or a mixture or combination of holographically grated layers with smooth (non holographic layers) transparent or semi opaque layers or a combination thereof (e.g. non prismatic, non mirrored), such holographically blazed, ion-etched (or ruled holographically grooved surfaces) offer adequate groove density for use in UV, Visible, IR, optical marking spectrums.

In the context of the present invention a light socket represent a light source or a plurality of light sources outputs (e.g. combined or separated) with independent ability to control their spectral distribution and on going operation or triggering, reducing the need for expensive light sources—such that are integrated with an on board controller, reducing required level of maintenance normally associated with the use of a single light source configurations, as a result, less complex (e.g. less sensitive light sources would not require as many sub-miniature electronics or fine optical or electrical parts which subsequently require periodical maintenance or replacement) light sources could be used to drive (e.g. supply the collectively required amount of light for a given optical marking system or a plurality of interconnected systems) for optically marking of an elongated indication path, this is of benefit since end users and/or producers alike would be able to focus their resources and expenditure in the optical output powers for light sources while increasing the safety levels by providing a non electric optical distribution points (on the optical socket) which facilitate a safe environment in which to manipulate light for the purpose of optically marking (high lighting or illuminating) an elongated indication path.

In the context of the present invention a plurality of light sources represent a single high intensity light source wherein light from said light sources is transferred or mixed to/or from or through the light socket or a combination thereof Further more for the purpose of the present invention, the light socket relates to a universal (e.g. able to accommodate expanding varieties of connectors from different manufacturers) light distribution points especially beneficial for optical marking (or visibly illuminating) of an elongated indication path, further more in the context of the present invention said light socket provide a universal platform accommodating the required expanding variety of fiber device connectors to accommodate different classes of optical marking or illumination devices (different types of light sources and/or fiber bundle section e.g. from different manufacturers), further more, for the purpose of the present invention, "retro-reflective" relates to any reflective material, and also to photoluminescence or phosphorescent materials.

For purposes of the present invention a "side emitting optical fiber" is any optical fiber which will transmit a desired frequency of light from one end to the other (using internal reflection of the fiber/s), and simultaneously allows some portion of the transmitted light to escape from the fiber during the transmission along the length, this escape of light may be continues along the entire length of the fiber, or may be restricted to a plurality of ("exposed") locations along the fiber/s.

Examples of supporting a light guide may be (a) by placing an adhesive material between the light guide and a support surface, (b) by embedding the light guide in a groove (of the support surface) prepared for holding the light guide in a partially exposed manner, (c) by grasping the light guide at selected support points (using any standard means for holding a cable), or (d) by suspending the light guide over (or between) vertical poles (or columns).

An indication path allows part or all of the exterior of the light guide (as measured at a plurality of cross section locations) to be seen. Placing the indication path behind clear, semi-opaque, holographically grooved surface, or opaque materials is also considered as exposed for the purposes of the present invention. According to an especially useful embodiment of the present invention, the indication path is embedded in or near a retro-reflective surface.

Aligning an end of the light guide with a light source (in normal practice) is comprised of a light guide end holder plug and a like contoured light source socket. However, since the light guide of the present invention is being used for its light loss properties (side emission) and not for any high efficiency light transmission properties (e.g. long distance data transfer), aligning of the end of the light guide need not relate to the alignment of any specific optic fiber in the light guide. Furthermore alignment may be done remotely by using at least one end emitting optic fiber to transfer light from a plurality of light sources to the optical socket output which guaranties adequate (e.g. constant required levels or flux density for optical marking and/or illumination.

A light source for preferred embodiment of the present invention is a poly-chromatic source of visible light. Monochromatic and non-visible (e.g. infra red) light sources are also useful for specific embodiments of the present invention. An especially useful embodiment according to the present invention (especially for efficiently aligning to an end of the light guide) uses a laser as the light source. For safety purposes, it is advised that the laser be used in conjunction with a mode-lock modulation detector (as are commercially available) which automatically turns off the laser when a break is detected in the light guide). Furthermore, it is recommended that the preferred embodiment of the present invention be used with the best available eye safety technology peripheral devices as are appropriate for each specific application.

Controlling the light source or light socket (by computer or otherwise) provides for choosing between more than one spectral signature of light from a single light source (by filtering) or from multiple light sources (by switching the light guide alignment or harmonically mixing or refracting the light from a plurality of light sources through the integrated optical socket). Thus, according to the preferred embodiment of the present invention, when the light source is poly-chromatic, then controlling the light source includes choosing between color components of the light for alignment with the end of the light guide.

According to the preferred embodiment of the present invention a semi-opaque sleeve is a tubular construct being light diff-using (opaque) at about the spectral signature of the light source, and optionally having in addition clear or light obscuring sections.

According to the preferred embodiment of the present invention the semi-opaque sleeve is made of a uniformnly transparent sleeve material/s having high flexibility (curvature radius) and having high environmental durability.

Furthermore, according to the preferred embodiment of the present invention the semi-opaque sleeve is an ultra violet filter. This simultaneously introduces two beneficial properties, protection of the observer from UV in the light source and protection of the exposed light guide from UV in sun light.

Likewise, according to the preferred embodiment of the present invention the sleeve is impermeable to water. This both protects the sleeve encased light guide and simultaneously increases the sleeve's resistance to accumulating externally adhering environmental dirt coatings.

When the present invention is used for applications such as transportation (or advertising) signs or signals, then in a preferred embodiment of the present invention the light source or a plurality of light source's output is computer controlled. Computer control allows convenient interfacing with external sensors, which may coordinate the use of the present invention with measures of (or sensor systems for monitoring) weather conditions, traffic loads, time schedules, etc.

A novel environmental embodiment of the device of the present invention wherein light from the light socket is projected into a rotating optical wind sign, this optical wind sign provide important environmental indication (especially at night or when dark) such as to the velocity of the wind in a given time, the optical wind sign include attaching sections of side emitting optical fiber/s to the wings of a propeller, the light is entering into a rotating common end termination without interfering with the mechanical processes of the propeller rotation, the rotation of the propeller is determined by the velocity of the wind wherein the dynamics of optically marking of an elongated indication path (e.g. the wing/s of a moving propeller/s) play an important roll in changing the entry angles into the fiber or fiber bundle/s causing dynamic changes in the condition for total internal reflection (in the fiber sections attached to the propeller wings) which are harnessed to project visual or textual message (e.g. "drive slow strong wind" or other warning signs). Further more the image or text on such optical wind signs could also be linked to the speed at which the optical propeller is rotating for the purpose of conveying such warning message only at a curtain speed (e.g. wind velocity)

Two especially useful light source control options are worthy of note. Firstly, control such that the light source is pulsed more than about 16 times per second, for providing the appearance of continuous illumination (and simultaneously for minimizing electric energy consumption). Secondly, control such that the light source is pulsed less than 16 times per second, for providing the appearance of flashing or warning lights.

Three especially useful specific embodiments of the present invention are worthy of note by reason of their usefulness in solving well known problems of ground transportation indication marking.

Firstly, the indication path is embedded in a road surface. This is a most practical and cost effective method whereby the sides of roads, the center lines of roads, and pedestrian cross walks can be clearly and durably marked for night time use.

Secondly, the indication path is along a road side barrier. This provides a highly visible elongated marking of the barrier. Intrinsically a barrier of more than two kilometers can be thus illuminated from a single light source.

Thirdly, the indication path is suspended from at least two vertical columns. These columns may be low fence posts, high electric pylon support structures, intermediate height street light poles, or even cross braced scaffolding. One novel application of the present invention suspends the light guide (from two tall vertical columns) and perpendicular to the flow of traffic entering an actuated intersection. Controlled color selection (e.g. red, yellow, green) of illumination from the light source (aligned with the end of the light guide) provides a high visibility alternative to the standard three bulb traffic light.

The present invention also provides a method wherein the indication path is an air ill transport marker. Examples include where the marker is parallel to an airport runway, and where the marker illuminates the height or shape of a tall structure.

The present invention also relates to a device having an optically marked elongated indication path according to the method hereinbefore described. This device is comprised of an indication path support, at least one exposed light guide supported along the indication path, and a light source aligned with an end of the light guide. As in the case of the present method, in the device the light guide is characterized by having at least one side emitting optic fiber within a flexible semi-opaque sleeve.

According to the preferred embodiment of the device of the present invention the light guide has a plurality of side emitting optic fibers. These fibers are of narrow diameters which greatly increases the use of the device along indication paths requiring complex bending and curving of the light guide. In applications where there is no requirement for complex bending and curving, the device of the present invention is embodied by an light guide containing a single graded index side emitting optical fiber. This graded index fiber has a cross section diameter of about between one half millimeter and one millimeter.

According to the preferred embodiment of the present invention the sleeve profile has a flat side. This feature allows the facile adhesion of the flat side to a support surface. Alternately this feature allows a higher visibility surface area for the same quantity of optical fibers. Likewise where the sleeve profile has two flat surfaces, both a facile adhesion surface and a high visibility surface area are simultaneously provided.

Three device embodiments of the present invention will forthwith be described. These device embodiments are especially useful in many transportation related applications.

Firstly, a device wherein the indication path support is a road sign or signal. Relevant examples include (a) for highlighting the outline of instructional, warning or stop signs, (b) for highlighting the written (or symbolic) message on such signs, or (c) for use as a traffic actuation light (red, yellow, green) or warning light (flashing yellow).

Secondly, a device wherein the indication path support is a horizontal traffic or pedestrian barrier. Relevant examples include (a) use on center line road dividing guard rails, (b) use on road side indicating fences, (c) use on ship deck side fence rails, (d) use on commercial queue side ropes (as are found in banks, and government offices), or (e) use on cable connected ship channel lane buoys.

Thirdly, a device wherein the indication path support is the body or appendage of a transportation vehicle, such as a car, truck, train, ship, plane, helicopter, bicycle, motorcycle, trailer, or balloon, for example, on (or in) a car the indication path support may be a hub cap, bumper, door frame, window frame, interior of the trunk, periphery of the engine block, door handle, or dash board.

Intrinsically, almost every finished item of manufacture can be used as an indication support. These items need not be restricted to applications related to transportation signs and signals. Ten additional device embodiments according to the present invention will forthwith be described. These devices represent only a minuscule sampling of the numerous practical devices wherein the method of the present invention is used. These device embodiments are presented as illustrative representatives of classes of devices wherein the light from a variety of different light sources are used (mixed and/or harmonized) for many other similar device embodiments which according to the present invention are utilitarian, according to the understanding of producers and users thereof Firstly, a device wherein the indication path support is a cable. In the context of the present invention, a "cable" is made from one or more strands of metal wire, plastic fiber/s, or natural fiber. Further more, the "cable" may be usable as a load bearing tensile member; such as are used in construction cranes, elevators, cable cars, ski lifts, kite string, etc. According to the preferred embodiment of this device, at least one exposed light guide is supported along the cable. These light guides may be supported (a) by wrapping or twisting the light guides around the cable, (b) by attaching the light guides to the exterior of the cable, (c) by sewing or weaving the light guide into the cable, or (d) by inserting the light guides into the cable during the production of the cable.

Secondly, a device according to the present invention wherein the semi opaque sleeve has sections of high transparency alternating with sections of low transparency.

Diverse device products may utilize (incorporate) this alternating transparency feature.

In one a workman's measuring tape where the alternating of sections is according to measured units (corresponding to the distances between measurement markings on a standard workman's measuring tape). In another example, a portable area discrimination marker for use in directing the flow of traffic around a traffic accident or around a construction area.

In these (and like) alternating transparency embodiments, regions of high transparency may also be etched (or otherwise embedded) within areas of low transparency sections. These regions may comprise recognizable shapes including letters, numbers, or designs. (e.g. holographically ruled, ion blazed, etched or grooved on the surface of fibers or sleeves)

Thirdly, a device according to the present invention wherein the indication support is a building member (including a post, a beam, a floor, a carpet, a wall, a ceiling, a door frame, or window frame, microphones support stands, a chair handle, an open wing of grand piano, a corridor, a table, clothes, scarves or fabric articles).

One practical application of this embodiment relates to selecting the pulse rate (of the light source or connected optical socket), for use as an optical signaling (optical marking) metronome. The optical signaling metronome is a valuable tool in the multi track recording processes expanding the use of optical marking of an elongated indication path by using short or long sequential pulses of light, these pulses provide visual time divisions or frames or beats or bars or rhythm/s or accent/s or a combination thereof to a recording, practicing, or performing artists (Musicians, dancers, choreographers, orchestras conductor/s, choirs, athletes etc.) each pulse of the optical metronome can have different optical signature, wave length (e.g. different color/s) at different (sequentially repeating if needed) times or patterns. These time domain high lights (as well as optical marking of elongated indication path) provide for chromatic time indication (different colors are illuminating in the fibers in accordance with the require pattern or beat). Unlike conventional metronomes the optical marking (signaling) metronome is requiring no acoustic isolation (like conventional audio metronome or "click tracks" which make a click sounds repeatedly causing unwanted click sounds onto the recording tape or disk.) eliminating cross talk (e.g. sound leakage from microphone and/or players headphones to neighboring channels during the recording process-causing un wanted noise on the wrong track on a multi-track recording machine or master tapes or computer hard disk recording systems. This optical marking metronome utilizes the method for optically marking an elongated indication path to provide chromatic time indication over long distances (such as on the walls of different recording rooms in a recording studio, rehearsal room, concert stage, mixing rooms or editing suits) allowing wide variety of artists to play or dance perform from written notes together without the need to turn their heads around and look at a screen (e.g. illuminating fiber section provides 360 degrees of illumination) or flashing light bulbs or hear a click, the optical marking metronome could be installed to provide 360 degrees (e.g. all around, surround visibility) in a given room with a thin side emitting fiber bundle, facilitating easy identification of the beat without loosing concentration or even moving the head, to prevent electrical noise normally associated with high intensity light sources, lasers and/or their power supply units—the light source/s could be positioned a way from the sensitive recording environment (away from the mixing room or PA system) with only the fiber sections reaching into the recording rooms for optically marking of an elongated indication path. The optical marking metronome may be a welcome addition for today's DAWs (e.g. Digital Audio Workstations) direct to disk or tape recording environments, it could be installed (supported or hanged) on a wall or a floor or a ceiling or a combination thereof for orchestras, musicians, singers, conductors, dancers, choreographers, producers, or as a useful addition to today's "dull" dance and music centers. The optical marking metronome provide a beneficial tool for deaf people which can not hear conventional metronomes (using click track & click or ring sounds) the optical marking metronome encapsulate a novel solution for practicing or performing or recording artist, musicians, dancers, choreographers, editors of audio or video or anybody requiring a discreet or specific repeatable visual optical marking signal (e.g. optically marking an elongated indication path—provide a long line of pulsating light which is beneficial being highly visible from all directions (up to 360 degrees) to all recording artists involve in the recording sessions or all orchestras members during a rehearsals or performance or any group of people requiring discreet (e.g. silent) queues or dancers practicing or performing or any combination thereof.

Fourthly, a device according to the present invention wherein the indication path support is an edge or surface of an appliance, a toll, or a module of furniture. The appliance may be a household appliance (such as a toaster, a food processor, or an electric cooking pot) and the light guide may be convoluted, wrapped, or embedded around the appliance. The tool may be a hand tool (such as an electric drill, saw or sander) or a construction tool (such as an air compressor). A module of furniture (such as a chair, a couch section, a desk, a cabinet, or a unit of wall mounted shelving) likewise may support an light guide by being convoluted, wrapped, or embedded onto (or into) the module.

Fifthly, a device according to the present invention wherein the indication path support is a fabric, or a thin film. Here, as in many of the other devices described heretofore, the light guide may be incorporated (into the fabric or the thin film) directly during the production process (of the fabric or the thin film). The light guide may alternately be attached to the fabric (or thin film) by sewing, gluing, stapling, or the like.

Sixthly, a device according to the present invention wherein the indication path support is an article made from metal, wood, plastic, glass or any combination thereof Here, as in many of the other devices described heretofore, the light guide may be directly incorporated (into the article, or into the material which is to be subsequently attached thereto) during the production process (of the article). The light guide may alternately be attached to the article using such means for attachment as are known to those familiar with articles made from such materials. The light guide may also be embedded into the article during the article fabrication.

Seventhly, a device according to the present invention wherein the light guide contains a strength member parallel to the light guide. Here the strength member is characterized by being coated with a reflective substance. The reflective substance may appear as polished metallic surface, a glossy surface, a monochromatic surface, a polychromatic surface, or a crystalline surface.

Eighthly, a device according to the present invention wherein at least one side emitting optical fiber is integrally enclosed within a flexible semi opaque sleeve. For a single fiber the integral sleeve enclosure is substantially on all of the elongated sides (not on the ends). For a plurality of fibers the integral sleeve may relate to each component fiber separately, to the exterior of the bundled fibers, or as the member for bundling the fibers.

It is known that aligning a single light source with an end of an optical fiber (or fiber bundle) and activating it will cause the light from said light source to bounce inside the fiber/s in accordance with the condition for total internal reflections, however, connecting a plurality of light sources will require complex optical alignment accessories often requiring (special interfaces—especially if the light sources are different types or from different manufacturers) cumbersome or expensive variety of connectors or interfaces. This provides limitations since light sources are currently not used in groups to project light into a single end termination of side emitting optical fiber (or fiber bundle/s), this limitation is preventing, current (methods & related devices) optical marking systems to be used (e.g. at high intensities) for illumination of larger areas (e.g. in addition to optical marking), given the high intensities of light which require the use of a plurality of light sources—the device of the present invention is not so limited, therefor the device of the present invention could be used for diverse optical marking or illumination applications (simultaneously, in a single system) such as for optically marking of an elongated indication path.

Ninthly, a device according to the present invention wherein light beams from a plurality of different light sources are harnessed and simultaneously transferred or guided into a centralized interconnected optical socket for the purpose of pre-mixing or aligning or calibrating or harmonizing or equalizing or focusing or expanding or refracting or conditioning or producing interference or projecting or a combination thereof of said light beams, prior to their visible projection into the actual optical marking of an elongated indication path (e.g. side emitting optical fibers illuminating and causing direct visual stimulation from about 400 nm to about 700 nm).

The use of an optical socket as a mean to enhance the performance of visible optical marking systems (all device classes) for specific location, field, application or the geometric or topographic installation requirements of the optical indication path is further illustrated and described in details;

The optical socket provides any individual optical marking system (or a plurality of interconnected systems on a network) the ability to "out source" light from a number of light sources simultaneously, providing for many important utilitarian benefits such as: a) The ability to mix various type of light sources output beams for the purpose of providing adequate optical throughput or spectral distribution into the visibly illuminating fiber sections (connected to the optical socket)—causing the compounded (e.g. mixed) light to create dynamic optical effects within the fiber (such effects are achieved by changing the alignment of beams of light into a plurality of fiber end faces (e.g. fiber bundles receiving light beams from various angles—causing the light in the bundle to dynamically move (backwards or forwards) in accordance with changing light entry angles and subsequent induced changes in the condition for total internal reflections (e.g. with in the side emitting optical fibers or fiber bundles, in real time, in the field) this is especially beneficial for transport safety—providing an important dynamic optical marking effects which grab the attention of passing drivers enhancing their awareness of the optical marking of an elongated indication path (e.g. thus when installed on road barriers the system can mark and/or direct the flow and/or direction of moving traffic or people along an elongated indication path such as a road, a corridors, a mining tunnel/s, a door frame or body, a window frame, a pedestrian crossings, stairs, a sign, a tensile strength optical rope, emergency ladders, tools for task forces such as fire departments, task forces to disaster areas, life saving teams at ski resorts etc.) this effect of inter-fiber animation or dynamic movement is also useful in providing compounded (simultaneously illuminating the same fiber/s or bundle/s with a plurality of optical signatures creating visible movements) b) The ability to provide any optical marking system with a number of interconnected light sources at a given time (e.g. high redundancy level of available light sources) increasing both safety, efficiency and durability of optical marking systems as well as substantially reducing their maintenance by providing a (non electrical) central light distribution point. By pre-mixing light beams (from a number of different light sources) into the optical socket it is possible to expand the scope of optical marking systems into higher optical intensities such that are used in actual illumination of larger areas (as well as optical marking). c) The integrated light socket allow for pre-alignment or connections to be made or changed according to specific programs (e.g. digitally encoded memory chips which are internal or integral to the system or externally either by the use of a remote computer for control of the light source/s or optical socket) in real-time (e.g. according to changing needs) d) The optical socket facilitate for higher safety standards by providing a centralized point from which (only safe light) light can be drawn into side emitting optical fibers (or bundles of fibers) but the electrical power which drive these light sources—do not pass that point-further increasing the distance (e.g. increasing the safety) between light sources connected to the optical socket with their associated electric power supply units close at hand, this result in increased distance between the electrical components and/or optical components (fibers) making the system (all device classes) easily accessible and safe. e) The integrated light socket facilitate expanding any optical marking systems (e.g. adding sections of fibers or bundles, connectors, light sources) with greater flexibility, safety and a highly central non electrical light drawing points for providing adequate levels of light for optically marking (or illuminating) of an elongated indication path anywhere. f) The integrated optical socket provide independent control over light distribution further reducing the high costs associated with light sources which have an on board controller/s, as well as the ability to combine various types of light sources (e.g. Halogen lamps, Metal Halide lamps, Micro-wave excitation lamps, Micro-wave excitation fiber lamps, Lasers, flash types lamps etc.) g) The integrated optical socket is especially useful for transport safety type of optical marking or illumination by providing a safe platform which accommodates high power light sources (e.g. such as a Micro wave fiber lamp or high intensity lasers at about 400 nm to about 700 nm, between about 1 to about 1000 Watt output powers) the socket is could be installed on road barriers, walls or any desired location, light is fed to the optical socket via optical fibers (or light guides such as liquid light guides), the socket provide a distribution point/s which are independently and remotely managed (using wired or wireless computer control and/or networking) from the light source and thus provide enhanced protection and/or isolation from heat, noise or other electro magnetic emission normally associated with high intensity light sources or their interconnected power supply units. h) The integrated optical socket provide an independent platform which for the purpose of optical marking—light can be used simultaneously for communication or illumination for triggering (internal or external to the socket) i) The integrated optical socket allow for many types of high intensity light sources (e.g. coherent, monochromatic visible lasers at about 532 nm, polychromatic Micro-wave excitation fiber lamps.) to be mixed together for the purpose of optically marking (or illuminating) an elongated indication path (e.g. road barriers, road sides building walls, corridors, shopping malls, pedestrian crossings, parking spaces, tunnels, ski slopes etc.) j) The integrated optical light socket provides central light mixing and/or distribution points on which side emitting optical fibers sections are connected, removing the need to position noisy electrical power units or light sources near or in the vicinity of an installed optical marking and illumination systems (e.g. in location where electrical noise or audible noise are unwanted), further more, the optical socket (being integral to the device of the present invention) is especially useful for ITS type systems (e.g. Intelligent Transport Safety systems) such as described in the different device classes of the present invention wherein said integral optical light socket with its on—board light sensing and/or imaging lenses or dimmers or light meters or light analyzer or wave division multiplexes or combination thereof can activate the operation of the light sources connected to it by setting or pre-programming a threshold for light intensity levels (or spectral distribution) of the surrounding environment (e.g. where the systems of the present invention may be installed such as road side, or safety barriers, a wall in a shopping malls, or room/s, or concert hall, or recording studios, or a door or the space below a raised floor, or the space above a drooped ceiling, or the space between infrastructure support members etc.), once these said threshold or thresholds levels has being set or programmed, the integrated optical light socket will activate (e.g. turn on) power supply to connected light sources or allow light from a predetermined light source/s which is already turned on—to pass to the appropriate fiber section/s. (e.g. distribution). Two example of such processes are forthwith illustrated in the following; 1st, an optical marking and illumination system is installed by road sides (on road barriers or pedestrian crossings), its integrated light socket is activating the light sources (of said optical marking systems) at sun-set, at night, and/or when its sufficiently dark for the system to be clearly seen, and/or deactivate said light sources at dawn or when there is sufficient sun-light (after sun-rise—during morning times), 2nd, further more the usefulness of the device of the present invention includes the installation of an optical marking system/s inside or outside buildings wherein the integrated optical socket will continuously sense the levels of light outside and/or outside said building for the purpose of activating or manipulating or modulating or controlling the operation of light sources connected to it or through it (e.g. the integrated light socket), making sure and/or verifying that an adequate level of light is constantly maintained (e.g. comparing environmental light levels such as sun light which enter the building through its windows etc.) k) The integrated light socket facilitate the production of dynamic optical effects by integrating an interchangeable cartridge carrying adequate optical components for selecting, connecting, resolving, mixing or any combination thereof for manipulating light (e.g. using beam expander/s, acoustic-optical shutters, lenses, wave division multiplexing, holographic gratings, optical isolation/s, micro-positioners, crystals, sensors, imaging transceivers, etc.). I) By integrating a timer or dimmer or spectrum analyzer/s or light meter or a combination thereof into the integrated light socket or controlling the light socket with an external signal or trigger; inputs or outputs could be controlled, connected, aligned or selected or resolved or mixed or a combination thereof for operation or monitoring. m) By installing an optical marking system with its integrated light socket onto road barriers, road sides, walls or location which require optical marking (and/or illumination) from multiple light sources—said integrated light socket provide for beneficial, safe, efficient, accessible—light distribution points (e.g. light inputs and/or outputs) wherein at least one side emitting optical fiber is required to illuminate an optical marking of an elongated indication path. n) The integrated light socket contain on board (or in the interchangeable cartridge) a GPS module (e.g. Global Positioning circuitry in a module) for global positioning or identifying of both—mobile or stationary optical marking systems (or systems section e.g. side emitting attenuation connected to the optical socket) o) The integrated light socket provide an efficient way of splitting the light from a single high intensity light source (e.g. such as Micro wave excitation fiber lamp/s at about 400 nm to about 700 nm, or solid state laser systems at about 532 nm) onto plurality of illuminating fiber section (and/or extensions). p) The integrated light socket can be connected serially or in parallel or a combination thereof for accommodating the require number of optical outputs (side emitting optical fiber bundles or single fiber or light guides) for adequate optical marking of an elongated indication path. q) A multiple roads junction/s could be (illuminated) optically marked by sections of optical fibers which draw their light from a single optical socket; this distance (between the actual light source/s & the integrated optical light socket is beneficial allowing the positioning of very high intensity light sources such as micro wave excitation fiber lamps (visible 400 nm–700 nm) or lasers with their associated power supply units to be positioned away from the actual traffic path (e.g. the optically marked road/s). r) The integrated light socket contains an interchangeable cartridge containing all necessary optical components for interconnecting or inter-operating or routing of the light socket or the light flow through it (optical marking system integrated with the light socket) such optical components include—lenses, beam expanders, beam splitters, beam expanders telescope/s, refractive optics, wave division multiplexing, collimating optics, acoustic-optical shutters, crystals, etc. Light from different light sources gets mixed and distributed to the desired or required indication path for optically marking of an elongated indication path. (with the fibers) s)The integrated light socket contain an antenna in which to receive triggering commands from remote computer and/or sending monitoring data of system operation or the environment where the system is installed. The integrated antenna allow the optical socket to be interfaced to a weather system or radar/s as well as traffic command control centers. t) The integrated light socket source could be active (e.g. electrically powered) powered by photo-voltaic cells (or solar panels) or batteries or electricity or a combination thereof or the integrated light socket could be passive (e.g. not powered) requiring no power other then light to pass through it or a combination thereof. u) The integrated light socket provide a safe centralized point from which end user and/or producers can handle high intensity light outputs such as generated by a 1000 Watt micro-wave excitation fiber lamp/s at about 400 nm to about 700 nm, or high intensity 532.2 nm (e.g. solid state or excimer visible lasers. v) The integrated light socket is especially beneficial for transport safety (e.g. Intelligent Transport Safety systems or ITS) during extreme weather conditions such as during fog, mist, storm/s, rain, dust, or sand storms wherein the sight of drivers on a given road (e.g. dangerous curves, pedestrian crossing/s, tunnels, slopes, or complex junctions or sharp turns) is impaired, the integrated light socket with its ability to harness the light from a plurality of light sources can provide much higher levels of light which in addition to optically marking an elongated indication path—provide sufficient optical output at the end of an optical fiber section (or bundle section or common end termination) to illuminate a larger area by positioning the end termination of a fiber or bundle of fibers facing the road allowing for spot light type illumination in addition to optical marking. w) The integrated light socket with its inter-changeable cartridge (e g cartridge containing sufficient optical elements for adequate optical manipulation) incorporates sensors or sensing circuits (CCDs) for sensing such weather conditions as fog, rain or storms (or other visibility impairing conditions) in advance—triggering or distributing adequate light levels (or light types, e.g. laser light penetration, saturation and/or polarization when in contact with fog, sand, smoke etc.) for optical marking of an elongated indication path. x) The integrated light socket benefits extend beyond transport safety alone—it could be used to charge photo voltaic cells in electric cars wherein the optical marking of an elongated indication path provides drivers with optical guidance to the recharging point (e.g. the optical light socket), a driver which wishes to charge his car will need a high intensity of light such as available from the optical socket, such process of optical ("refueling") recharging can be provided by road sides from the optical socket wherein the optical marking of an elongated indication path (provide drivers wishing to optically recharge their car batteries) provide drivers with visible marking & illumination as to where to drive or stop for such optical charging from the integrated optical socket. z) The integrated optical socket is especially beneficial for transport safety applications as well as many illumination applications by keeping its front or back panels or its entire enclosure frame or body—transparent (e.g. glowing when light is passing through it on its way to the connected fiber sections (or extensions), this transparency facilitate easy identification or verification as to the exact physical location of the operating light sources connected to it (or in close proximity in the field) as well as providing clear (visible) indication as to its exact location for easy reach and/or accessibility (in addition to the use of an incorporated GPS module within the interchangeable cartridge), further more the use of optical sockets (as part of optical marking systems of elongated indication paths of the present invention) will reduce infrastructure expenditure such as isolation wherein liquids (e.g. water pipes or flammable liquids or gases) conduits or chambers need to be installed in close proximity's)

These specific device class examples, while beyond the class of "especially useful for transportation signs and signals", also represent new and useful embodiments of devices wherein the method of the present invention is applied.

The present invention will be further described and clarified in detail by FIGS. 1–10 These figures are solely intended to illustrate the preferred embodiment of the invention and are not intended to limit the scope of the invention in any manner.

FIG. 1 illustrates a schematic view of a helicopter landing pad.

Figure 2:
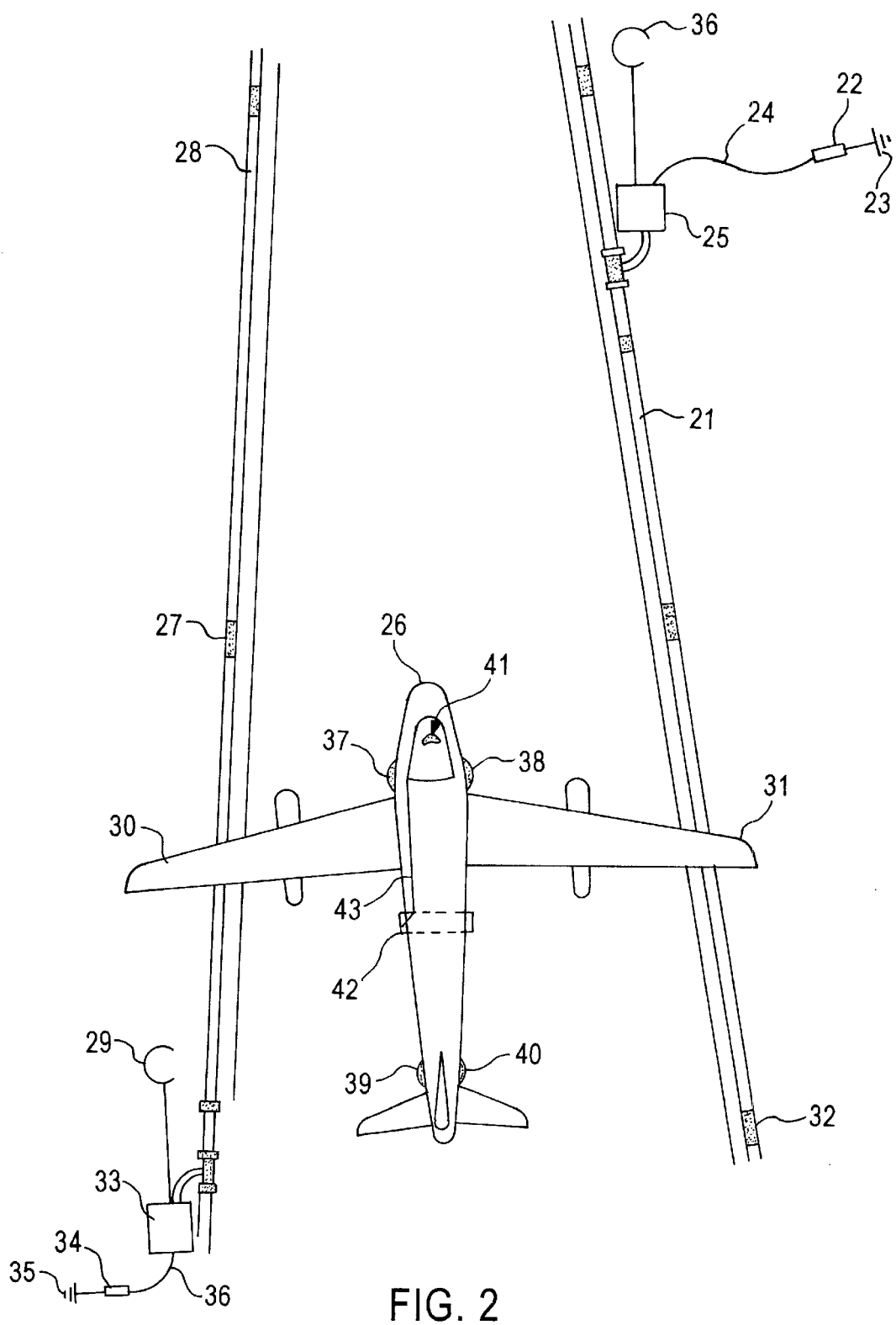
FIG. 2 illustrates an overhead view of an airport runway optically powered from a light socket.

FIG. 1 illustrates a schematic view of a helicopter landing pad optically powered by a light socket for optically marking of an elongated indication path, and a hovering helicopter above said optically marked (illuminated) landing pad, and a hovering helicopter above (landing or taking off). The ground serves as an indication path support for the helicopter landing pad. An exposed light guide (1) supported along the indication path, and a (coherent) laser light source (2) electrically powered by (20) and a micro wave (excitation fiber) lamp (3) is aligned with an end of the light guide (4) or light guide/s transferring light (5) (6) to interconnected light socket (7) for pre/post mix and adequate projection into section/s (or looped single fiber or bundle section) of side emitting light guides (8) (9). The light guides shown in this illustration are characterized by having a plurality of side emitting optic fibers within a flexible semi opaque (holographically surface grooved) sleeve. The resultant elongated indication path is a large optically marked ellipse which serves as a helicopter landing pad. Placement on the ground of the light guide with its aligned light source (or a plurality of light sources through integrated light socket is both facile and fast, complete electrical safety is maintained due to the distance of the light sources (e.g. connected before the light socket) and the actual illuminating fiber/s sections. The spectral signature of the light source may be in a visible frequency or in the infra-red range (invisible frequencies) or according to the need in the field. Also shown is a hovering helicopter (10) wherein the indication path support (11) is the body or appendage of the helicopter. Accordingly, a light guide (12) according to the present invention is embedded on the indication support, and aligned with an on board light source (13) (e.g. laser/s, micro wave (excitation fiber) lamp, torches or projectors) and light socket (14) connected together at the top tail of the hovering helicopter. Side emitting light guides sections are serially connected using interfaces or connectors (15) (16) or in loop configuration of single light guide (17) for adequate optical marking efficiency. The system can be remotely activated by the use of the light socket's integral (e.g. on board) antenna (19). An On or off or timing commands (18) (wireless) are activating (or controlling) the system.

FIG. 2 illustrates an overhead view of an airport runway. The ground serves is an indication path support for an exposed light guide (21) supported along the indication path, and a light source (22) electrically powered by (23) is aligned with an end of a light guide (24) for light transmission to light socket (25). The semi opaque holographically grooved (sleeved side emitting optical fiber or bundle of fibers) light guide is characterized by having at least one side emitting optic fiber (e.g. a light guide or as part of a plurality of light guides) within a flexible semi opaque (holographically surface grooved) sleeve. The indication path is an air transport marker parallel to an airport runway. The light source is remotely controlled by radio from the air traffic control tower (not shown). Control parameter options include light color, and light flashing rate, an air plain (26)—visibly guided by the optical marking of an elongated indication path on both sides of the run-way (28) left side with its associated light source (laser or micro wave excitation lamp) (34) electrically powered by (35) transmitting light to light socket (33) through an interconnected light guide (36), the plain (number 26) is verifying its position through the use of on board sensors (37),(38), (39), (40) or visibly by looking through the cockpit (41) or by using a video module (42) & taking off or landing down or synchronizing its position (e.g. sync, between positioning systems of the air plain with those of the pilot or control tower activating the light sockets—33 & 22) for optical marking (or illumination) of an elongated indication path (e.g. airport run-ways).

Figure 3:
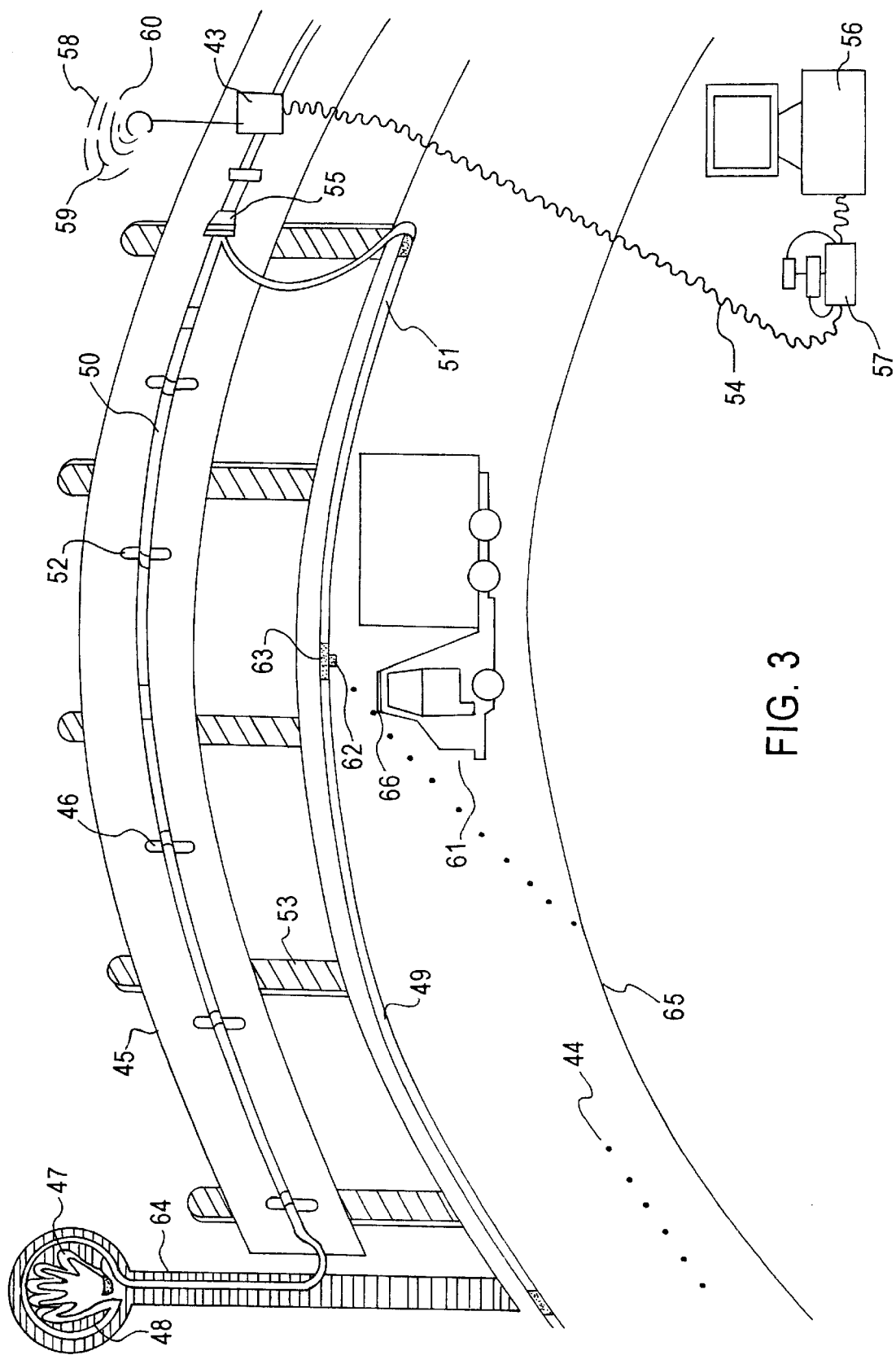
FIG. 3 illustrates a panoramic view of a road, optical marking on road barriers for ITS (Intelligent Transport safety system/s) type of optical marking of an elongated indication path for transport safety and signs.

FIG. 3 illustrates a panoramic view of a road. Shown here are indication path supports embedded in a road surface (44), along a supported ((53) road side barrier (45) by securing transparent brackets (46), (52), and on the surface of a road sign (47) by adhesive or sandwiched between two layers (48). An exposed light guide (49), (50), (51), is supported along the indication paths, and a light source is aligned with an end of a light guide (54) which deliver adequate amount of light to the light socket (43) The light guide is characterized by having a plurality of side emitting optic fibers within a flexible semi opaque biographically grooved tube or sleeve. The light for the indication paths has been divided using a "Y" connector (55) attached to one incoming and two outgoing light guides. The light source (57) (or a plurality of attached light sources) (is computer (56) controlled, or requested by incoming control signals (58), (59), through transceiver antenna (60), (incorporated on board light socket), This allows the light source/s and/or light socket or combination to be activated and controlled according to the many complex parameters of today's transportation network/s. Control factors for optical marking of an elongated indication path may include operational duration & timings, requested light signature/s, pulse intensity, acousto-optical shutter triggering or modulation of operational velocity, control of telescopic beam expanders, beam splitter/s, refractive crystals or remote selection of module of filters, acousto optical dimmers, alignment/s or combination thereof within the adequate interchangeable cartridge on board the light socket, time of day, weather conditions, traffic conditions, or even according to road side vehicle (61), (or pedestrian) proximity (66) sensor (62) readings or image sensor triggering signals.

The light source is a poly-chromatic micro wave excitation (fiber) lamp or lasers, Controlling the light source includes choosing between color components of the light for alignment with the end of the light guide (e.g. within the integrated optical light socket). In this illustration the light source is remotely aligned with the supported light guide (64) This allows a single computer controlled light socket to provide illumination for numerous optically marked elongated illumination paths.

Figure 4:
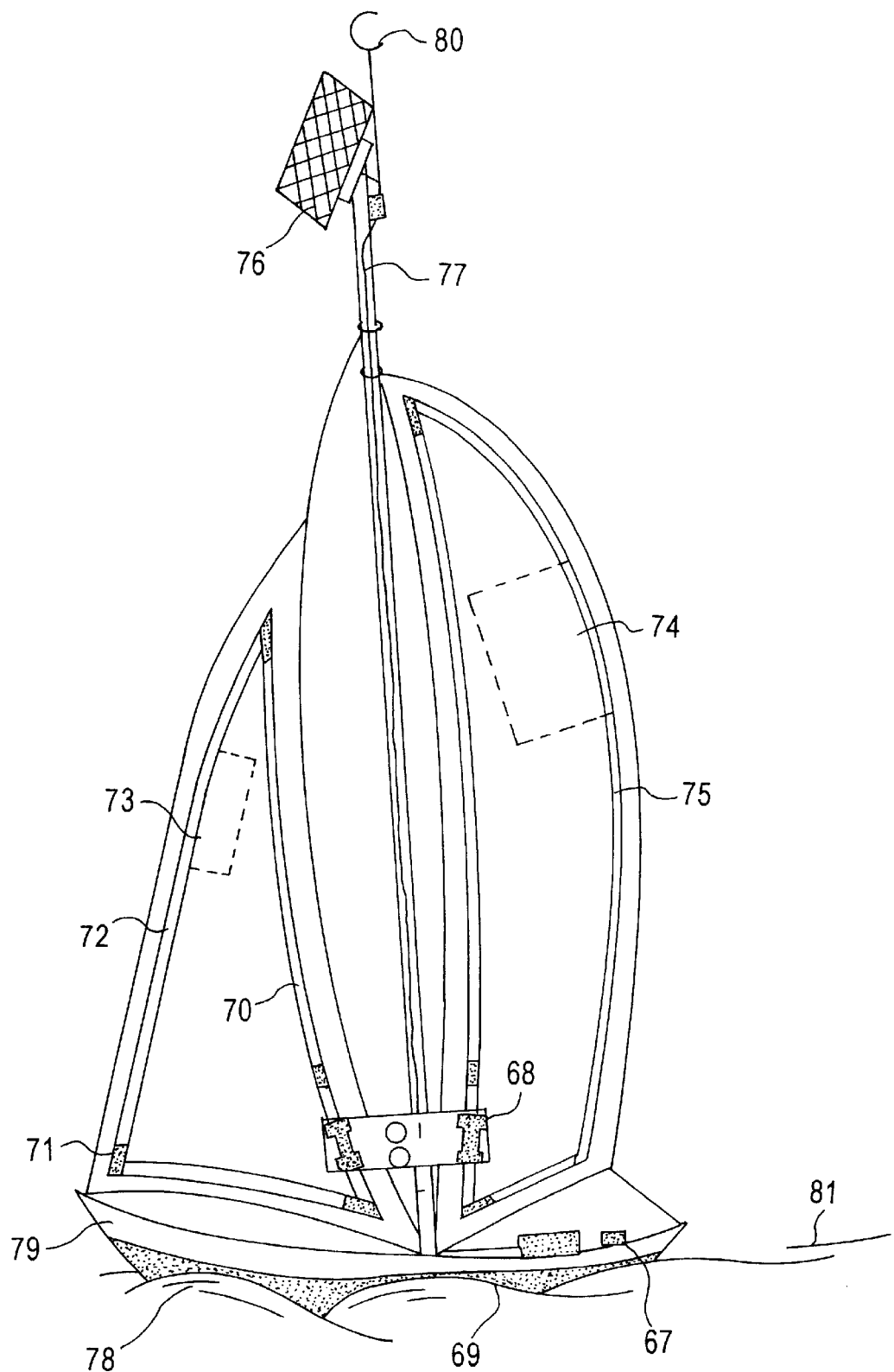
FIG. 4 illustrates an isometric view of a ship.

FIG. 4 illustrates an isometric view of a ship. The ship's hull (81), (78) is shown partially submerged. A central mast (77) provides the vertical support for a pair of sails (74), (73), (18). The outer edge of each sail serves as the indication path support, the sails could be integrated with at least one retro reflective patch or reflective material/s to reflect the light from exposed light guides (72), (75), the light guides are optical path shunted by "T" connectors (71) to an interconnected (e.g. by a light guide not shown) light socket and light source (69), (67), a photo voltaic panel (76) is shown powering the antenna (80) of the light socket (on extension lead) for remote operation of the ship's optical marking of an elongated indication path at sea. (81).

Figure 5:
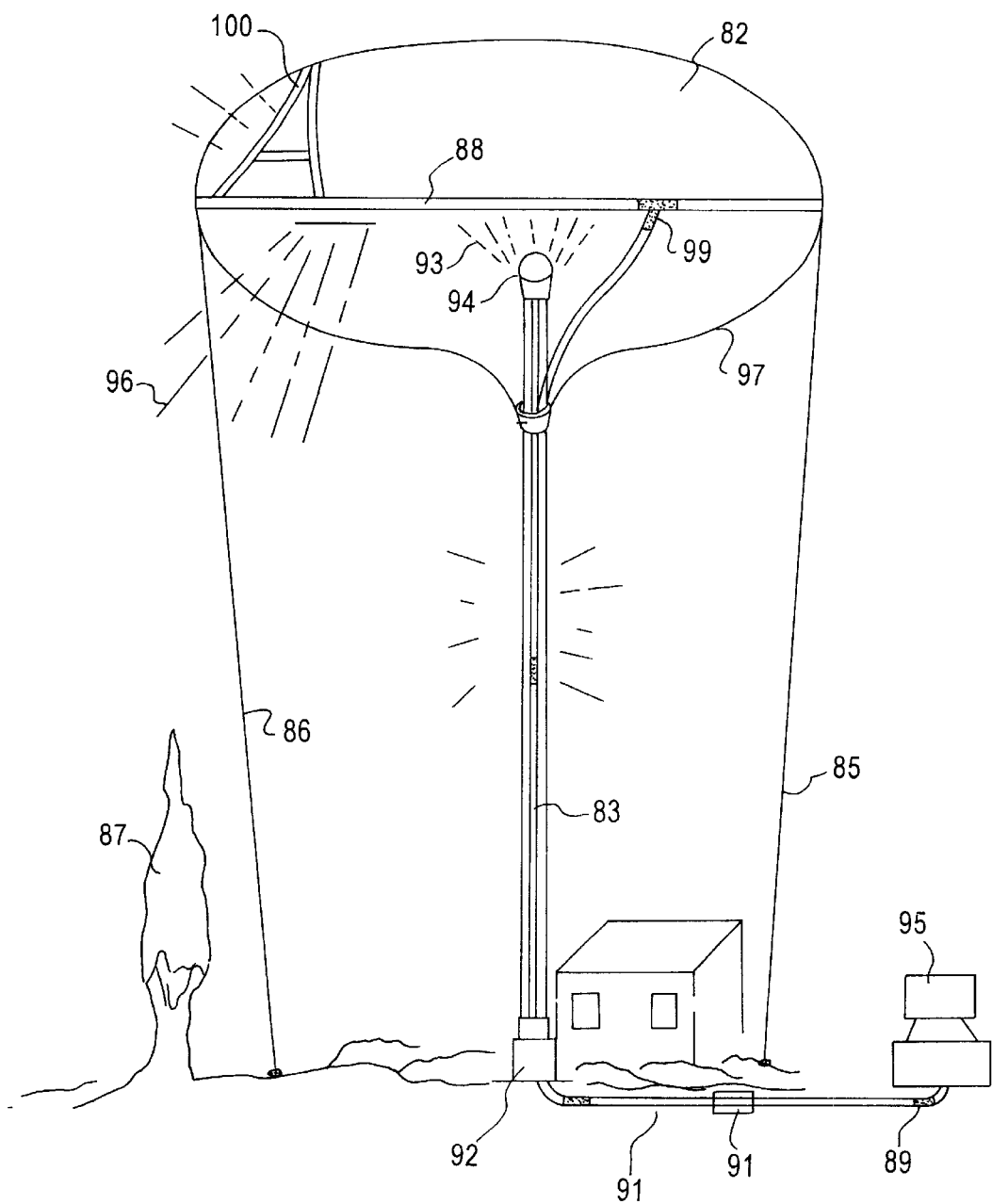
FIG. 5 illustrates a panoramic view of a balloon

FIG. 5 illustrates a panoramic view of a balloon. A lighter than air balloon (82) is tethered (86) (85) on two ends to the ground. A computer (95) controlled light socket (92) and light source (90) (micro wave excitation polychromatic fiber lamp or lasers) are aligned with a light guide (91) to the light socket, The light guide (83) is both supported by and connected (98) (at the upper end) to the balloon in connector. (HeNe filled balloon), the residual light from the end of the optic light guide enters the gas of the balloon, causes a stimulated emission of the gas, emitted light is reflected down by retro reflective or reflective materials to optically mark or illuminate larger areas and results in a balloon glow lamp effect (with no need to carry the light source/s on board the balloon, e.g. light is distributed to the balloon through the computer controlled or remote controlled light socket). Alternately the end of the vertically supported light guide (99) can be further connected to a second light guide (not shown) which is supported on the surface of the balloon or on a fabric netting which encloses or attached to the surface of the balloon (100) thus text or shapes could glow from residual light at the end of the optically marked elongated (or illuminated) indication path.

Figure 6:
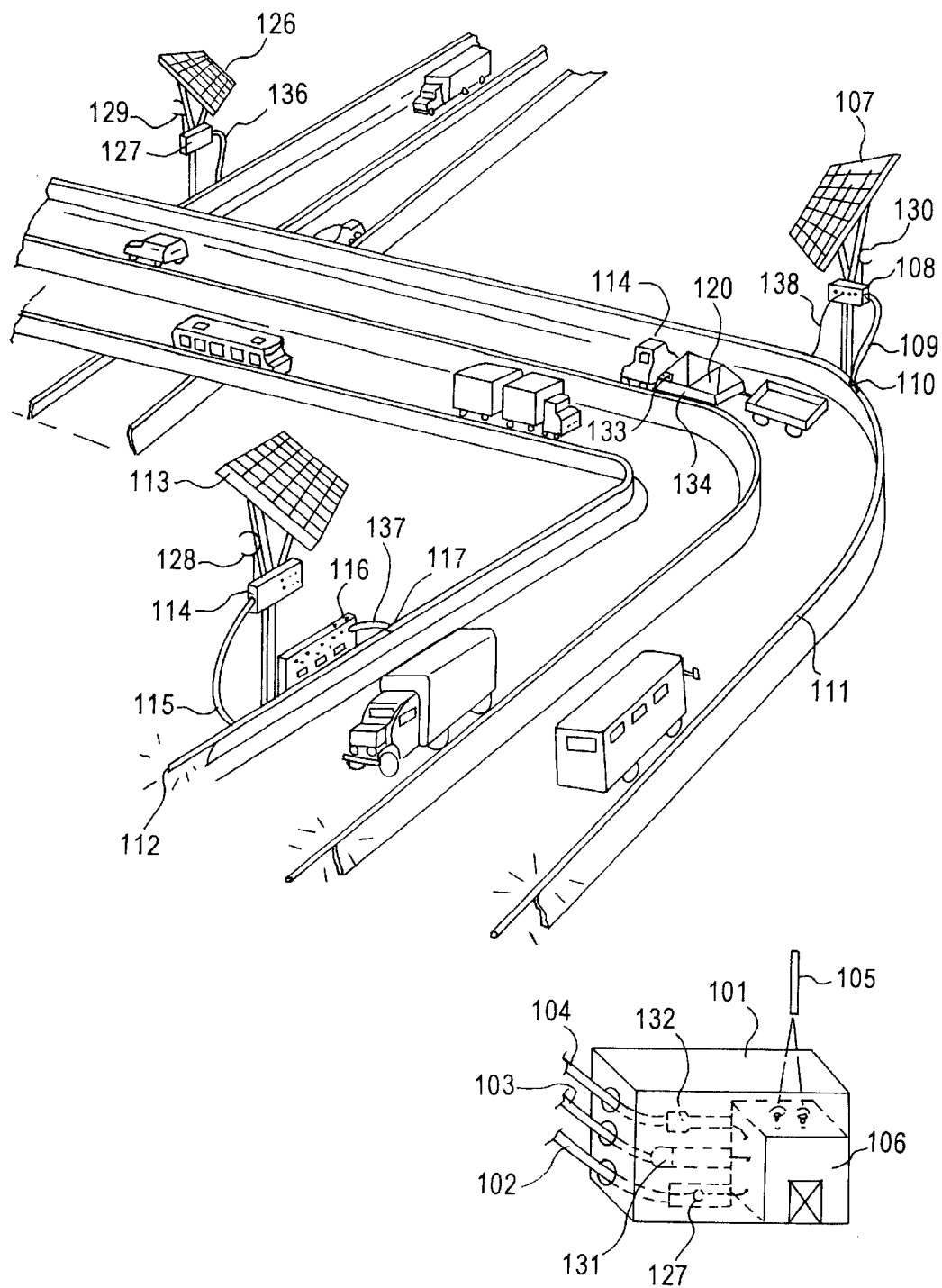
FIG. 6 illustrates a panoramic view of a road.

FIG. 6 illustrates a panoramic view of optically marked or illuminated road, an exploded perspective of a plurality of light sources (down on the left of the illustration) positioned at a safe distance (for adequate level of electrical safety), the light sources are enclosed in a protective enclosure (101) housing a polychromatic micro wave excitation fiber lamp (127) seen aligned to light guide (102) for guiding the light to the appropriate (near by) light socket/s, above it with in the enclosure is a high intensity multi mode coherent laser light source (131), aligned to a dedicated light guide (103), above it (132) represent a flash type light source with (fast reaction time), light from light from the three (remotely) enclosed light sources is distributed (guided) to the appropriate light socket/s (114), (108), (127) from which the compounded (e.g. mixed or spatially conditioned) light is distributed for optical marking or illumination of an elongated indication path. The road is optically marked by exposed light guide/s (111), (112), (115), (118), (125), with one of the vehicles (119), is carrying a portable light source (133) with attached light socket (134) aligned to a sections of side emitting optical fibers (120) (or light guides) for mobile optical marking of an elongated indication path (the body or cargo of the vehicle). Electrical supply connection to a battery is indicated by (105) wherein the solar (e.g. photo-voltaic panel) energy is used to power or charge a battery during the day for optical marking (operating the light socket with attached light sources at night) of (125) (or illuminating) an elongated indication path. The safety interlock/s (e.g. a safety feature turning of the current) of the remote light sources is linked to the independent interlock of the connected light socket via an electrical or optical link (135) The three types of light outputs are distributed via (136) for laser light, white (or refracted) polychromatic light from the microwave fiber lamp is distributed via (137), and compounded light (e.g. mixed outputs of all three types of light sources is distributed through (138) for adequate optical marking (illuminating) of an elongated indication paths.

Figure 7:
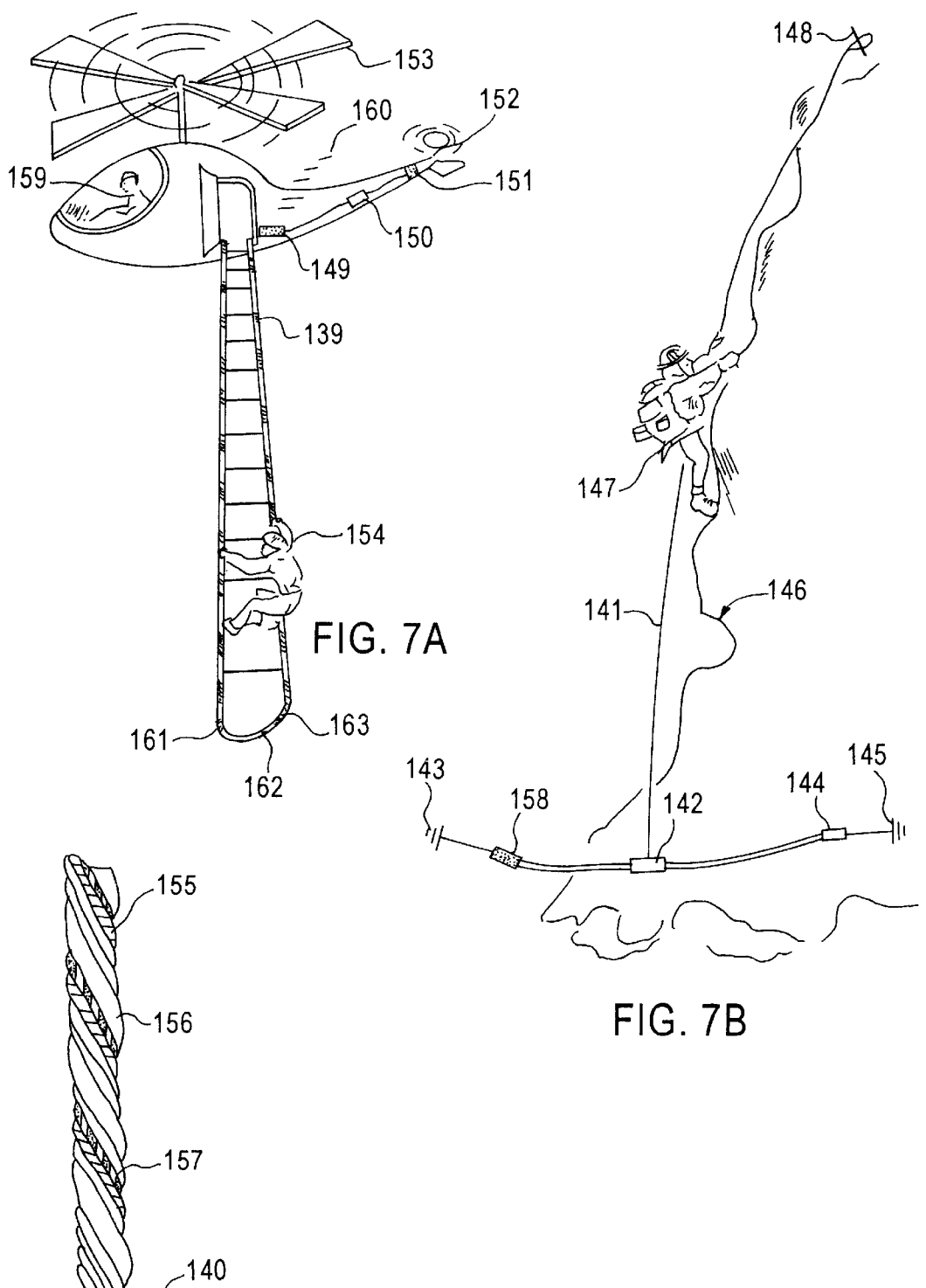
FIG. 7 illustrates an optical strong, rope (tensile strength optical rope)

FIG. 7 illustrate a schematic view of a strong (e.g. tensile strength) optical rope (139), (141), (140) especially useful for optically marking of an elongated indication path while having the ability to carry heavy weight such as that of a person (154), (147), useful for task forces to disaster areas, life saving task forces at ski resorts or mountain climbing of difficult terrain's at night or at bad or impaired visibility weather conditions, a light socket (142),(149) is distributing light to the optical rope (e.g. exposed light guide or bundle of light guides integrated, threaded or wieved with strong material or fiber/s) from an interconnected light sources (on the right) (158) (on the left) (144), these light sources are electrically powered from (143), (145) electricity (such as from battery, solar photovoltaic panel, or combination), an optical rope for marking of an elongated indication path is shown hanging down from a hovering helicopter the optical rope is held in a shape of a ladder carrying the weight of a climbing person, light is distributed from the light source (150) via the light socket (on board the helicopter) to the illuminated rope ladder (from a light socket & attached light source on board the helicopter). An exploded perspective of a single integrated) section the optical strong rope (140) is included on the left of the illustration wherein a reflective tensile strength member (157) is shown threaded together with at least one side emitting optical fiber (156), a fluorescent or phosphorous member (155) is shown threaded (integrated) into the optical rope for sustained illumination (e.g. even after light socket or light sources are turned off), a person is seen climbing a tensile strength optical rope or cable secured at the top by (148) a mountain climbing rock nail. A looped configuration (using a section of fiber/s) is illustrated (161), 162), (163) for putting residual light at the end of the optically marked indication path (the strong optical rope ladder) back into the (illuminating) optical marking of an elongated indication path for increased illumination intensities, the big & small rotors (152), (153) of the helicopter is painted with adequate retro reflective paint for adequate reflection (160) of light from the optical marking of an elongated indication path (with the optical tensile strength rope).

Figure 8:
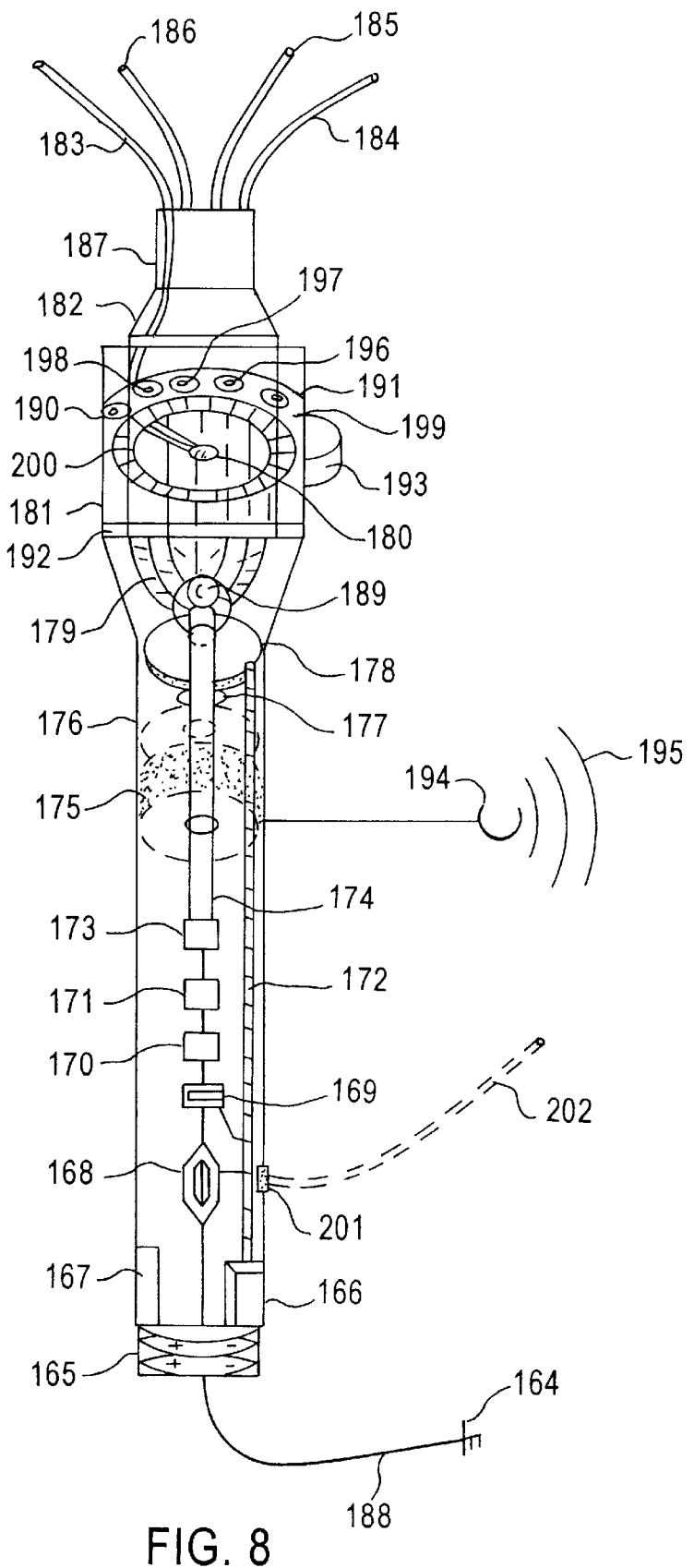
FIG. 8 illustrates a schematic view of a micro-wave fiber lamp for optical marking, of an elongated indication path.

FIG. 8 illustrate a schematic view of a micro wave excitation fiber lamp (181) inside a micro wave protecting or shielding pipe enclosure) especially useful for optical marking (e.g. illumination) of an elongated indication path/s— The fiber lamp is shown powered by electrical current from power supply (164) with attached electrical cable (188) (existing electrical infrastructure, battery/ies, solar photovoltaic paneus or a combination thereof), the micro wave fiber lamp can have its own integrated (rechargeable) batteries (165), a highly coherent microwave beam is being guided through (174) and projected into an adequate transparent capsule (189) containing adequate mixture already in plasma form (e.g. plasma from light emitting solids or gases (e.g. light emitting once stimulated or excited by microwave energy), at least two coherent micro wave beam are projected into the capsule (not shown) creating a constructive interference inside said capsule, the capsule is located on top of an active sound membrane (178) located on top of a wider isolating air capsule (175) to keep the light emitting substances mixed and stabilized (as a result of sound vibration from the membrane) at the appropriate (constant) levels the two capsules (e.g. plasma capsule & isolating air capsule) are positioned one on top of the other with a thin film (176) in between, a high intensity visible light from about 400 nm to about 700 nm is emitted as a result of the constructive interference (not shown) of the microwave beams (e.g. causing intense excitation of the audio or sound (e.g. vibrations) stabilized plasma capsule) light from the capsule is emitted at high intensities such that are especially useful for optically marking or illuminating an elongated indication path (or a plurality of indication paths or areas) wherein a reflecting surrounding surface (179) is directing the light into selected optical outputs (190), (191), (196), (197), (198), (199), (200) in an interchangeable rotating (optical output/s wheel (190), a micro positioner (193) (e.g. sub-miniature electrical driving engine) is rotating the wheel according to incoming control commands (195) from (controlling light socket, not shown) a remote light socket (or in a vicinity of the micro wave fiber lamp) these control commands are received through the transceiver antenna (194) positioned to the right of the air capsule and extending (or attached) outside the shielding enclosure (181) (e.g. micro wave protection shielding, or isolation and include selection of optical signatures (e.g. range of wave lengths, dynamic filtering operation (wavelength filtering, refracting, on/off operation, alignments) and safety interlock. These incoming control commands thus effect spectral distribution or optical signatures or intensity or distribution path or safety interlock or on/off or pulsed operation, or duration of illumination or a combination thereof, once a control command has being received, the micro positioner drive (e.g. mechanically move the wheel), for the purpose of aligning selected outputs on the outputs wheel to be in the path of the emitted (or reflected form the surrounding reflective surface/s) light (e.g. open or aligned to receive light), light from the lamp is then entering selected output paths (out of a plurality of outputs paths on the rotating wheel) for adequate level of light from the micro wave fiber lamp to enter condition for total internal reflection thus being guided, projected, transferred or adequately distributed into four optical fiber bundles (183), (186), (185), 184) shown at the top of the illustration, to guide light to connected light socket/s (not shown or to (directly) illuminate (holding together a plurality of optical fibers wherein at least one of said fibers is a side (emitting) fiber within a flexible semi opaque (holographically surface grooved) sleeve. The micro-wave fiber lamp is especially useful for transport safety applications such as optically marking or illuminating of an elongated indication path or for optically marking of an elongated green house for optically marking or illuminating (e.g. for controlled photo-synthesis as well as), an AID (168) (e.g. an analog to digital converter) is shown connected to on board sound controlling electronics (170), (171), (173) for synchronization (locked or resolved operation) between the current supply to the micro wave fiber lamp and the intensity level of the active sound membrane (vibration) provides adequate level of stability for the light emitting (stimulated or excited) plasma, an external (exclusive) light socket connection (202) is shown for wired or wireless connection (e.g. control link) to a light socket/s (can be optical or electrical signals) by locking (resolving) the intensity of the sound capsule to the operational current which drive the microwave fiber lamp—a constant linear smooth dimming of one will dim the other (e.g. locked together) thus allowing for a remote light socket to control the micro wave fiber lamp directly with minimum glare and maximum efficiency. A special delay mask is incorporated into the micro wave fiber lamp's active sound capsule and drive electronics wherein sparks or sudden reduction in current will not effect the output of the lamp for predetermined periods of time further enhancing the stability and/or durability of optical marking or illumination of en elongated indication path.

Figure 9:
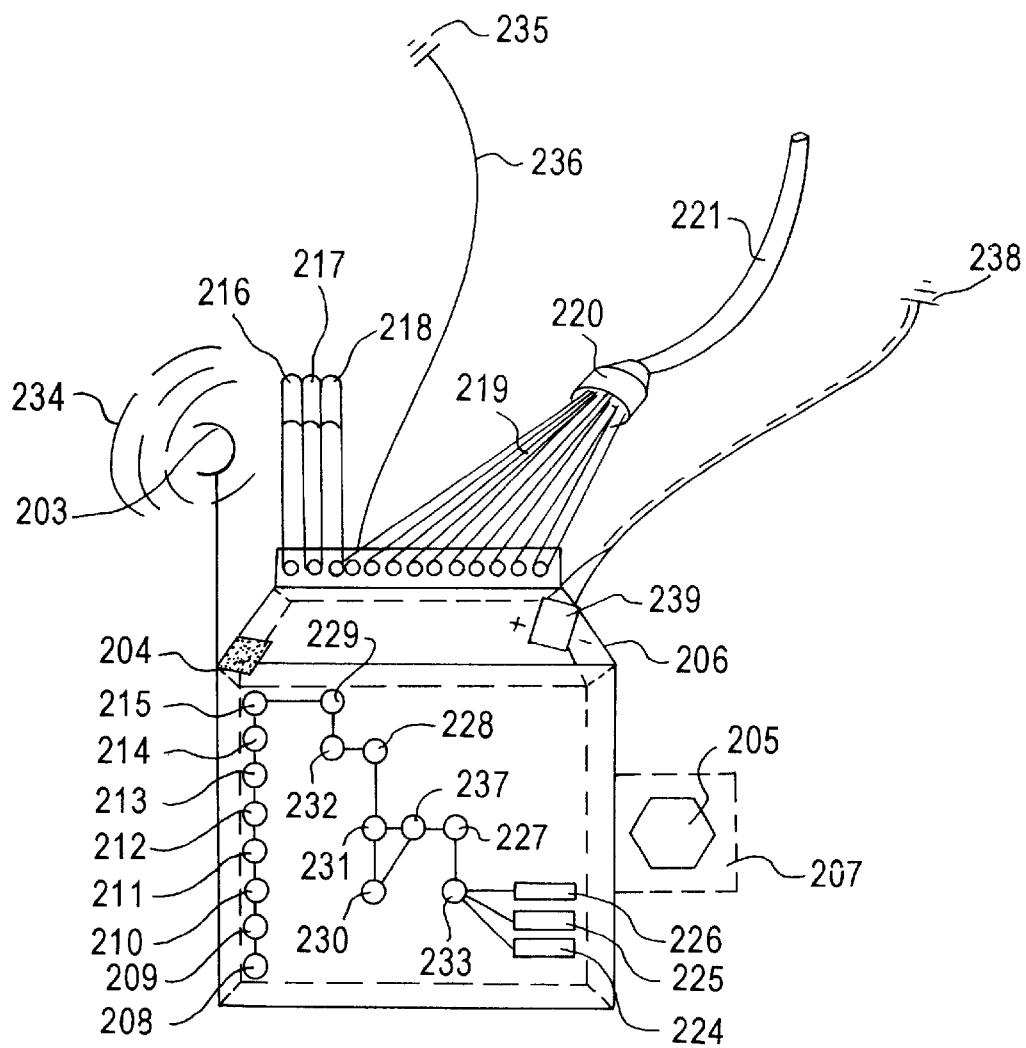
FIG. 9 illustrates a schematic view of a light socket.

FIG. 9 illustrate a schematic view of an integrated light socket, different types of light source's outputs are entering (e.g. feeding light to) the light socket inputs at rear via adequate light guides; these guides deliver visible multimode laser light (216) from about 250 nm to about 2400 (e.g. at 532 nm the color green, within the visible spectrum UV (for special environmental applications) (217) at about 250 nm–270 nm, micro-wave fiber lamp (218) at about 400 nm to about 700 nm, the outputs from the light socket are indicated on the front (for the various connecting fiber extensions types such as round or slit types), (224),(225), (226), (227), (228), (237), (230), (231), (232), (233), (229), ((215), (214), (213), (212), (211), (210), (209), (208), (these input or outputs configuration could be changed by loading a different interchangeable cartridge) an integrated transceiver antenna (203), is shown for its purpose of transmitting and/or receiving control command to and/or from external computers or light sources (e.g. light socket control the light sources connected to it), a sliding interchangeable cartridge (207) is shown on the right of the light socket with on board (loaded) crystal (205) for conditioning light beams within the light socket according to required criteria (e.g. topographic parameters, required spectral distribution, intensity, refraction etc.) for a predetermined optically marking of an elongated indication path., a Global Positioning System (e.g. a GPS) module (204) is incorporated for easy monitoring, operation and/or identification of the light socket. The body of the light socket (206) (or parts of it) could be transparent—allowing for it to glow while light is "pumped" (e.g. distributed or actively passing through the light socket), an incoming control signal (234) from a remote computer or sensor is received by the antenna for automatic alignment, distribution and/or optical mixing of light (from a plurality of different light sources for the purpose of optically marking of an elongated indication path adequately. A 2nd electrical cable (238) (e.g. optional—indicated by doted lines) connects the light socket to an external electrical power supply or to solar (e.g. photo-voltaic panel/s) which charge the on board batteries (239) during the day for activating, driving or powering the light socket during the night. A multi tail fiber bundle harness (220) is shown within one cable (221) (holding a plurality of fibers or light guides) which splits on entry to the light socket for selective feeding (e.g. inputting) of light for optically marking of an elongated indication path, two reflective cups (222) (a round type reflective cup), (223) (a slit type reflective cup) are shown at the bottom of the illustration, these reflective cups (once inserted into the appropriate output/s or input/s—block the required (e.g. un used inputs or output) and by reflecting back the light into the internal circuitry (e.g. light guiding matrix) increase the efficiency of the light socket as well as providing an important safety (keeping the light socket clean from environmental contamination such as dust and/or grim etc.)

Figure 10:
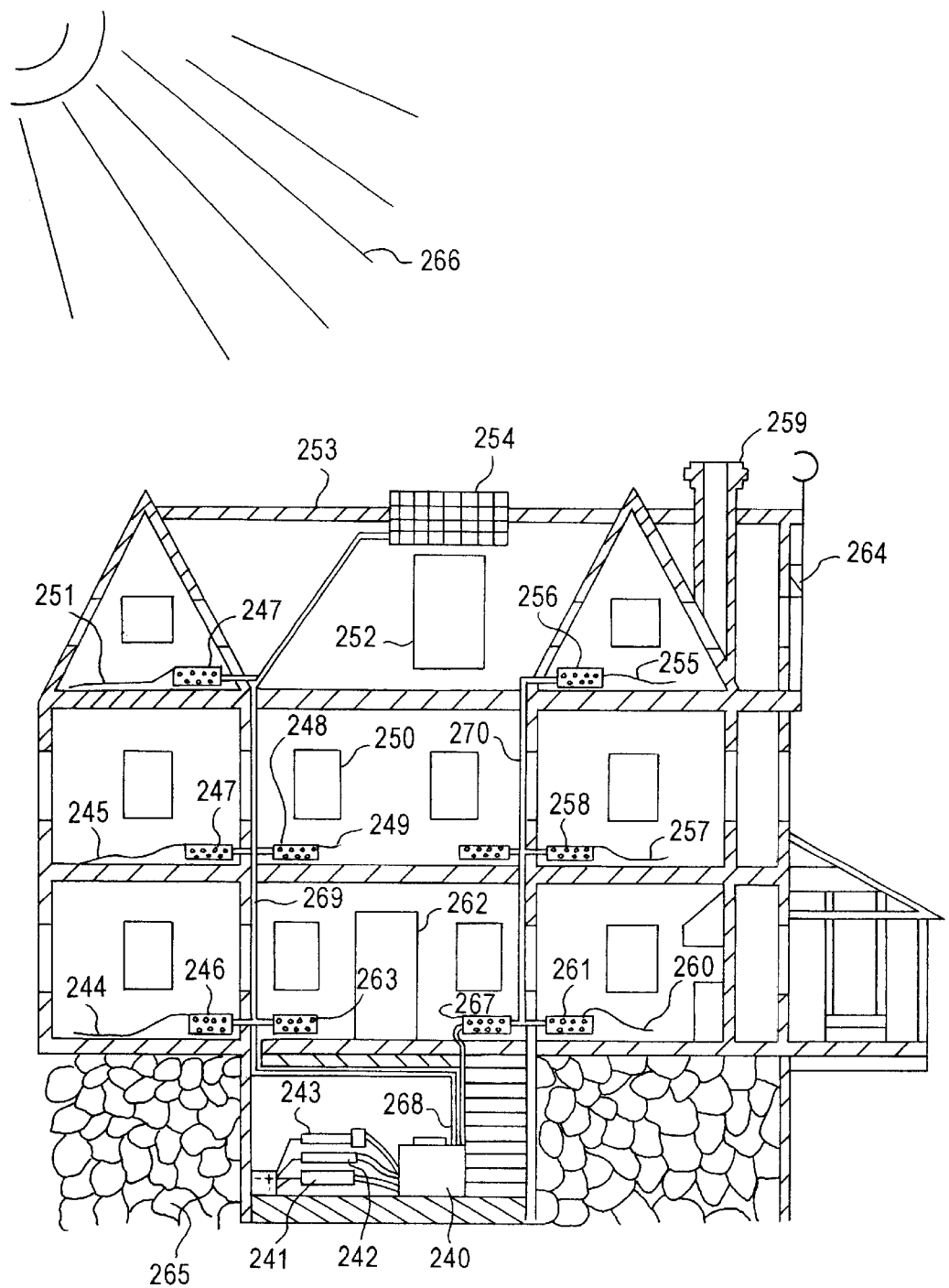
FIG. 10 illustrates a schematic view of a three floor house with individual light socket FIG. 11 illustrate a schematic view of an optical marking metronome.

FIG. 10 illustrate a three stories house with at least one individual light socket (246), (247), (248), (263), (261), (258), (256), (267) in each room in the house (S rooms), a "central light room" (e.g. in the basement where a plurality of different types of light sources are positioned for safety), the walls of the basement are protected by bricks (265) light sources include a multi mode (or single mode) laser from about 250 nm to about 270 nm (241), a polychromatic micro-wave fiber lamp (242) from about 400 nm to about 700 nm, and a UV light source from about 250 nm to about 270 nm (e.g. for special optical irradiation), the windows (252), (250), (262) are open and indicate that light from the outside environment is entering the house interior, Fiber sections (260), (244), (245), (249), (251), (257), (255) are each connected to respective light socket for optically marking or illumination of an elongated indication path, a central power unit (240) (e.g. electrical power supply unit) is located within the central light room (in the basement) saving on electrical infrastructure expenditure, a fiber light receptor unit (254) is harnessing sun light into the house, located at about the same high of the chimney (259) (e.g. into the light socket for distribution to individually connected light sockets, a light meter sensor/s (264) is incorporating a dimmer circuit (not shown) for continuously sensing the level of available light (environmental light outside the house) outside and/or inside the house adjusting level of required illumination according to a threshold set by end user (e.g. person who lives in the house) to conserve energy and provide a smooth equilibrium of natural light & electro-optic light (e.g. light from the light sources in the basement—through the optical socket), a fiber distribution network (268), (269), (270) carries the light from the light room (from the light sources in the basement) through to each of the individual light sockets (in the different rooms of the house) for optically marking or illuminating an elongated indication path.

Figure 11:
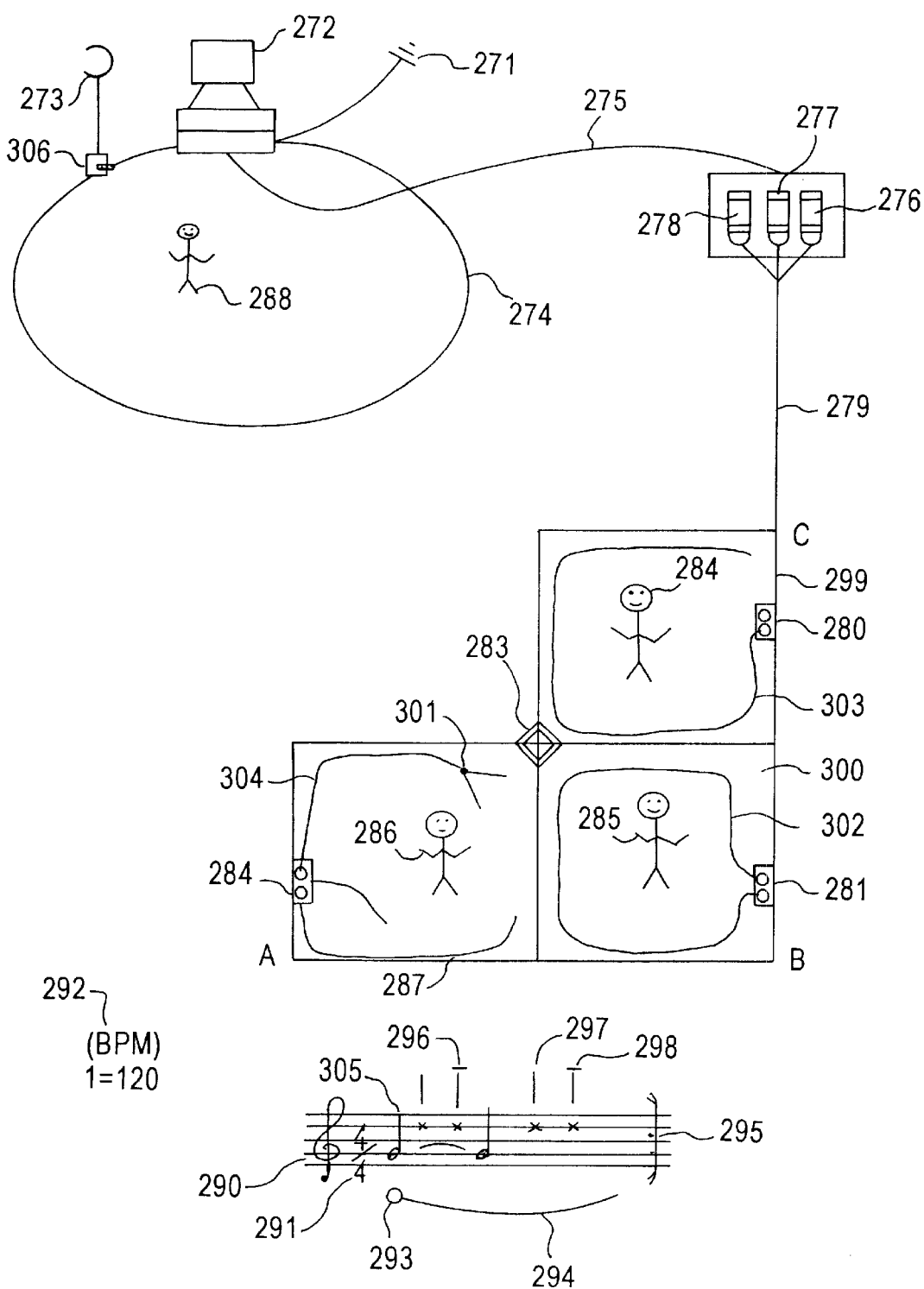

FIG. 11 illustrate a schematic view of an optical signaling metronome using an optical marking of an elongated indication path, a power supply unit (271) (electrical) is powering a computer (272) multimedia workstation with attached light sensor (273) integrated with a light source (306), a fiber section (looped configuration e.g. both sides connects to the same single light source) the computer is driving the light source to illuminate at predetermined time intervals optically highlighting the indicated beats (290), (291), (305), (296), (297), (298), (295), (293), (294), (292), in the bar (e.g. could be adjusted according to changing needs, the computer is also controlling a selection of three light sources; a laser light source (278), a micro-wave fiber lamp (277), and a flash type polychromatic light source (276), light from these light sources are guided using an adequate light guide (279) to three separated rooms (A 287), (B 300), (C 299), the light from the light sources is distributed to each individual light socket (e.g. in each of the rooms), from each light socket the light is transferred to adequate section of side emitting optical fiber/s (or fiber bundles) (303), (302), (304) in each of said rooms for the purpose of providing optical marking (of time intervals or accentuation's), the rooms central light sensor (283) is providing optical reading of the fiber/s illumination for triggering and/or synchronizing to various protocols of musical instruments M.I.D.I, MTC, VITC etc.(for example; such as M.I.D.I—e.g. Musical Instruments Digital Interface a protocol used to drive and communicate between drum machines, synthesizers, tape machines and Digital Audio Workstation (workstation to record, edit or play sound, normally on hard disk or M/Os (e.g. magnetically optical recording media) each illuminating fiber section (side emitting optical fiber/s or fiber bundle) provide 360 degrees of illumination (e.g. optical marking of an elongated indication path) for the observers, players especially useful for deaf recording artists providing valuable rhythm indication or time domain signaling and/or optical marking of an elongated indication path/s. The optical metronome provide essential rhythm tool for deaf persons and/or recording artist wishing to record music, image, practice, rehearse, perform or play to time, the use of an optical metronome/s eliminates cross talk (e.g. a click sound normally heard on headphones during recording procedures—these click track or rings and/or clicks sounds gets recorder on adjacent tracks on a multi-track recording machine causing lost of valuable time and expense trying to "clean" (e.g. erase these click sounds from the recording tracks). The optical metronome can help players, artist, deaf persons or any group of people to integrate time indication without loosing concentration (e.g. visible from 360 degrees, eliminating a musician, producer, conductor, player, task forces from turning their heads sideways from the written notations) the optical metronome provide a specially beneficial tool for multimedia authors an editors by optically marking an elongated indication path.

Figure 12:
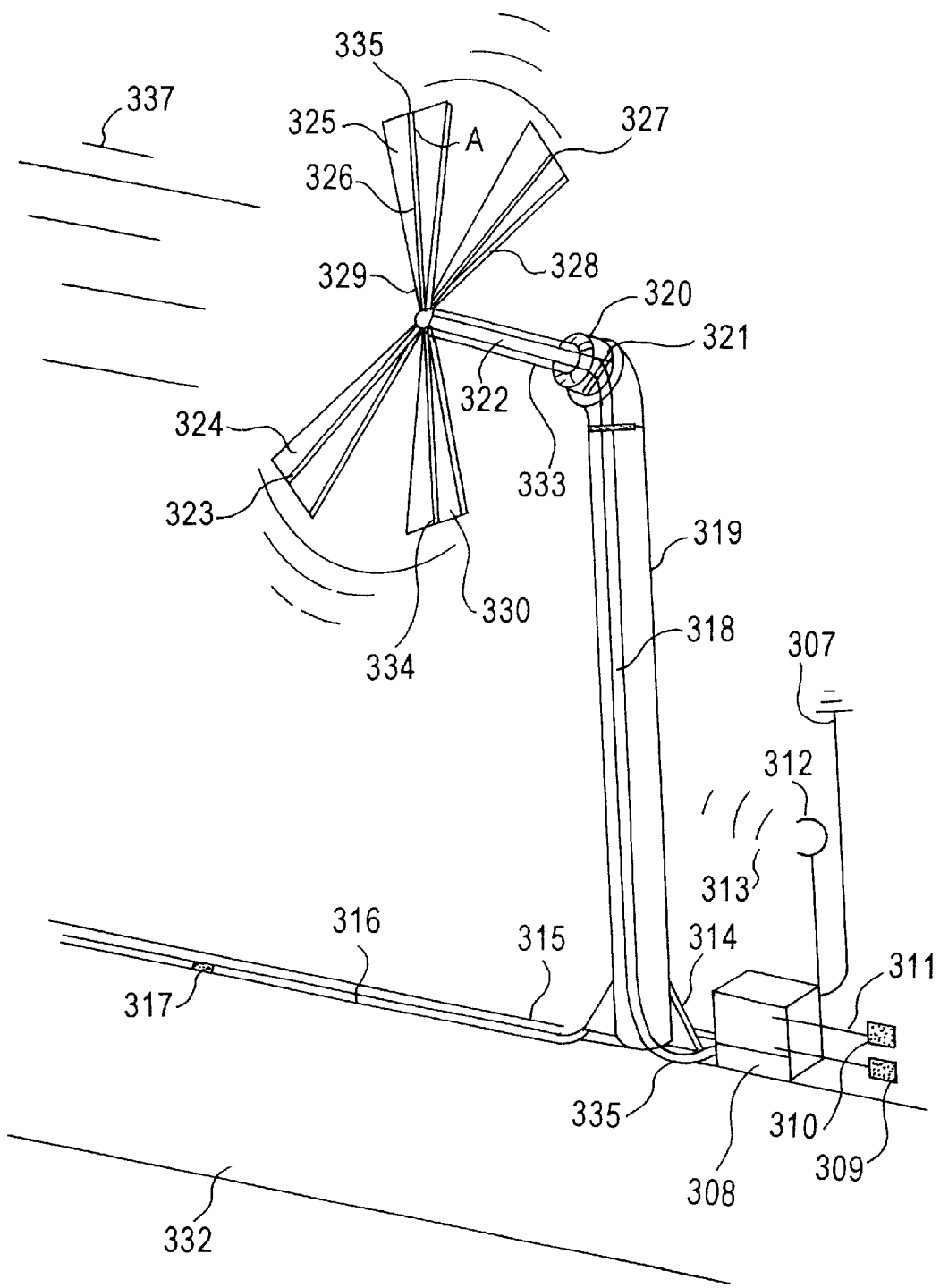
FIG. 12 illustrates a schematic view of an environmental optical wind sign

FIG. 12 illustrate a schematic view of an environmental optical wind sign wherein a plurality of exposed optic light guides are attached to the turning.(e.g. rotating) wings (330), (324), (325), (328), of a propelor. The wings and base (320) are free to rotate or turn around when there is sufficient wind, light is distributed from the light socket (308), to the propeller wings trough a light guide (318), two types of light sources are shown electrically powered by (307) from existing electrical infrastructure or solar panels (e.g. which charge a battery during the day for operating the light sources & attached light socket at night; a multi-mode laser (310), from about 380 nm to about 700 and a micro-wave fiber lamp (309) from about 400 nm to about 700 nm are shown to "drive" (e.g. provide adequate level of light) or illuminate the side emitting optical fiber/s (334), (323), (326), (327), (or fiber bundles) which attached to the four rotating or turning wings at one end, and to a common end termination (e.g. termination end holding a plurality of fibers), a transparent support stand (e.g. in the shape of a pipe) is holding the propeller in place while the force of the wind (when available) is turning the wings around, a reflective paint (329) on one of the wings reflects the light emitted by the side emitting optical fibers, a focusing lens (321), is shown focusing a beam of light (or beams of light) from fiber end (or bundle end) to the turning base and wings (with the attached fibers) the light beam/s is stationary (e.g. stay at the same angle and does not move around) while the base of the propeller (which holds the common end termination of a fibers) and its four wings turn around, this (e.g. turning of the common end termination of the multi tail bundle of fibers) causes continues changes in the angle/s for total internal reflection in the turning fibers (attached to the wings) facilitating dynamic optical movement like effects within the side emitting fibers on the wings of the propeller, a 2nd fiber section is connected to the light socket for optically marking of an elongated indication path by the road (332) sides. Text could be drawn on any of the wings (335) to correspond with a message once the turning wings of the propeller have gathered sufficient speed or when the wind is available, having sufficient force (331), an incoming control commands are received by the transceiver antenna (on board the light socket) for remote computer operation of the light socket (duration of illumination, pulse—rate, optical signature or distribution etc.) ground level is indicated by (315) wherein the exposed side emitting optical fibers (316), (335), provide an optically marked elongated indication path along the road side. The propeller provide indication as to the velocity of the wind while providing an interactive and dynamic sign.

What is claimed is:

1. A method of optically marking an elongated indication path, comprising the steps of:

supporting a light guide along the indication path; and aligning an end of said light guide with at least one light source;

wherein said light guide comprises at least one side-emitting optic fiber within a flexible semi-opaque sleeve, the semi-opaque sleeve is holographically grooved to enable a predetermined degree of transparency to light being transmitted by said at least one side-emitting optic fiber.

2. The method according to claim 1, wherein the semi-opaque sleeve is an ultra-violet filter for protecting observers' eyes from UV radiation coming from the light source and for protecting said at least one fiber from UV radiation in sun light.

3. The method according to claim 1, wherein the sleeve is impermeable to water.

4. The method according to claim 1, wherein said aligning comprises:

coupling the light guide to the light source through an integrated light socket; and controlling the light socket by a computer.

5. The method according to claim 1, wherein the light source is polychromatic.

6. The method according to claim 4, wherein said controlling includes selectively coupling, by the light socket, one or more color components of light generated by the light source to said end of the light guide.

7. The method according to claim 1, wherein said at least one light sources comprises a laser.

8. The method according to claim 1, wherein said at least one light sources is pulsed more than about 16 times per second, for providing the appearance of continuous illumination.

9. The method according to claim 1, wherein said at least one light sources is pulsed less than 16 times per second, for providing the appearance of flashing or warning light.

10. A method according to claim 1 wherein the indication path is embedded in a road surface.

11. A method according to claim 1 wherein the indication path is along a road side barrier.

12. A method according to claim 1 wherein the indication path is suspended from at least two vertical columns.

13. A method according to claim 1 wherein the indication path is embedded in or near a retro reflective surface.

14. A method according to claim 1 wherein the indication path is an air transport marker.

15. A method according to claim 14 wherein the marker is parallel to an airport runway.

16. A method according to claim 14 wherein the marker illuminates the height or shape of a tall structure.

17. A device having an optically marked elongated indication path for use in the method according to claim 1, comprising an indication path support, at least one exposed light guide (1) supported along the indication path, and a light source, or the collective output of a plurality of light sources (2), through a light socket (7) is aligned with an end of said light guide, wherein said light socket is an integrated light input and output active component which allows harnessing of light from various light sources simultaneously and controlling over the distribution of light into the output light guide and wherein said light guide is characterized by having at least one side emitting optic fiber within a flexible semi opaque sleeve wherein the semi-opaque sleeve is holographically grooved to enable a predetermined selective transparency with respect to light wavelength and with respect to viewing angle.

18. A device according to claims 17 wherein a light socket input/s can modulate a light socket output/s for adequate optical marking or illumination of an elongated indication path.

19. A device according to claims 17 wherein the light socket collective optical throughput or its harnessing light from a plurality of light sources connected to it, facilitate a high redundancy level of light sources increasing the durability and/or reliability of optical marking or illumination of an elongated indication path.

20. A device according to claims 17 wherein the light socket accommodate an interchangeable cartridge with required connectors, lenses, beam expanders, beam splitters, beam expanding telescope/s, alignments shunts, refractive optics & crystals, wave division multiplexes, AID converter/s, a GPS module, a transceiver antenna, an interlock circuits, a timer, a memory chip or module, a selection of sensors or imaging optics, micro positioners, acousto-optical shutter, shutter/s, spectrum analyze, dimmer.

21. A device according to claim 20 wherein the light socket's interchangeable cartridge provide a centralized platform for connecting light sources or fiber devices from different manufacturers providing a one stop universal connection light socket.

22. A device according to claim 17 wherein light from a plurality of light sources is harnessed or mixed or distributed by an integrated light socket to be projected at the end of raised or supported side emitting light guide for spot light type illumination of a predetermined radius or topographic area of the optically marked elongated indication path.

23. A device according to claim 17 wherein the light socket is powered by a solar panel/s or photo-voltaic cells recharging on board batteries during the day for controlled operation or activation or synchronization or a combination thereof of the light sources connected to it during the night.

24. A device according to claims 17 wherein the light socket enclosure is transparent or partially transparent for glowing while light is passing through it for easy identifying or locating at night or when dark.

25. A device according to claim 17 wherein at least one side emitting optical fiber is integrally enclosed within a flexible semi opaque sleeve.

26. A device according to claim 17 wherein the light guide contains a strength member parallel to the optic fiber and characterized by said member being coated with a reflective substance.

27. A device according to claim 17 wherein the sleeve profile has a flat side.

28. A device according to claim 17 wherein the semi opaque sleeve has sections of high transparency alternating with sections of low transparency.

29. A device according to claim 28 wherein the alternating of sections is according to measured units corresponding to the distances between measurement marking on a workman's measuring tape.

30. A device according to claim 28 wherein regions of high transparency are etched or holographically grooved or otherwise embedded within areas of low transparency sections.

31. A device according to claim 30 wherein the regions comprise recognizable shapes including letters, numbers, or designs.

32. A device according to claim 17 wherein the light guide contains a single graded index side emitting optical fiber, and said graded index fiber has a cross section diameter of about between one half millimeter and 1800 millimeters.

33. A device according to claim 17 wherein the indication path support is a road sign or signal.

34. A device according to claim 17 wherein the indication path support is a horizontal traffic or pedestrian barrier.

35. A device according to claim 17 wherein the indication path support is the body or appendage of a transportation vehicle, selected from balloon, bicycle, car, helicopter, motorcycle, plane, trailer, train, truck, or ship.

36. A device according to claim 17 wherein the indication path support is an environmental optical wind propeller/s.

37. A device according to claim 36 wherein the wings of an environmental optical wind propeller are coated or painted or covered by reflective materials for highlighting text or message when the wings are turning at sufficient speed (when there is wind).

38. A device according to claim 17 wherein the indication path support is a cable.

39. A device according to claim 38 wherein at least one exposed light guide is supported along the cable, by wrapping or twisting around the cable, or by being inserted into the cable during the production of the cable.

40. A device according to claim 17 wherein the indication support is a building member including a post, a beam, a floor, a wall, a ceiling, a door frame, or a window frame, a road barriers, fences, a bottom of a pond or lake or sea, water surface when floating or suspending in water or liquids.

41. A device according to claim 9 wherein the pulse rate of the optical marking is selected for use as an optical signaling metronome providing chromatic optical marking of time domain beats, accents or rhythm or bars or frames or time markers or a combination thereof for deaf practicing, performing or recording artists.

42. A device according to claim 9 wherein the pulse rate is selected for use as an optical signaling metronome for silent optical beat signaling eliminating cross-talk between adjacent channels on a multi-track recording machines or during high quality direct to disk recording procedures.

43. A device according to claim 9 wherein an optical signaling metronome is used in large halls, corridors or predetermined sections or predetermined topographic environmental areas for synchronized chromatic time indication along an elongated indication path providing queues to groups of people such as an orchestra or task force.

44. A device according to claim 17 wherein the indication path support is an edge or a surface of an appliance, a tool, or a module of furniture.

45. A device according to claim 17 wherein the indication path support is fabric, or a thin film.

46. A device according to claim 17 wherein the indication path support is an article made from metal, wood, plastic, or any combination thereof.

47. A device according to claim 44 wherein the light guide is embedded into the article during said article's fabrication.

48. The method according to claim 9, wherein the pulse rate of said at least one light source is selected so as to provide, by the optically marked indication path being used as an optical metronome, 360 degree chromatic optical time marking of the elongated indication path which is distributed in computerized multimedia platforms or stations.

49. The method according to claim 48, further comprising:

providing a plurality of devices using or conforming to a time protocol; and providing a plurality of optical sensors for capturing, translating and providing triggering signals to the devices from the optical marking pulsed illumination of the elongated indication path, thereby synchronizing the devices by the optical metronome.

50. A device according to claims 17 wherein the light source is a micro wave fiber lamp connected through the light socket from about 400 nm to about 700 nm for optical marking and/or illumination of an elongated indication path.

51. A device according to claims 17 wherein the micro wave fiber lamp optical distribution or optical signature/s or intensity or dimmer is controlled by the audio frequency of the on board isolated active sound membrane.

52. The method of claim 1, wherein said at least one light source comprises a plurality of light sources having a collective output being coupled to a light socket.

53. The method of claim 52, wherein the light socket is a light input and output active component which allows harnessing of light from the light sources simultaneously, and controlling distribution of the light to said end of the light guide.

54. The method of claim 1, wherein the light is visible.

55. The method of claim 1, wherein the semi-opaque sleeve is holographically grooved so as to allow the light of a predetermined wavelength to escape said light guide at a predetermined angle.

* * * * *